(12) United States Patent
Xie et al.

(10) Patent No.: US 11,645,533 B2
(45) Date of Patent: May 9, 2023

(54) IR DROP PREDICTION WITH MAXIMUM CONVOLUTIONAL NEURAL NETWORK

(71) Applicant: NVIDIA Corp., Santa Clara, CA (US)

(72) Inventors: Zhiyao Xie, Durham, NC (US);
Haoxing Ren, Austin, TX (US);
Brucek Khailany, Austin, TX (US);
Sheng Ye, Campbell, CA (US)

(73) Assignee: NVIDIA Corp., Santa Clara, CA (US)

( * ) Notice: Subject to any disclaimer, the term of this patent is extended or adjusted under 35 U.S.C. 154(b) by 537 days.

(21) Appl. No.: 15/929,242

(22) Filed: Mar. 17, 2020

(65) Prior Publication Data

US 2020/0327417 A1    Oct. 15, 2020

Related U.S. Application Data

(60) Provisional application No. 62/831,568, filed on Apr. 9, 2019.

(51) Int. Cl.
| | | |
|---|---|---|
| *G06N 3/084* | (2023.01) | |
| *G06F 30/398* | (2020.01) | |
| *G06N 3/04* | (2023.01) | |
| *G06F 119/06* | (2020.01) | |

(52) U.S. Cl.
CPC ........... *G06N 3/084* (2013.01); *G06F 30/398* (2020.01); *G06N 3/04* (2013.01); *G06F 2119/06* (2020.01)

(58) Field of Classification Search
USPC .......................................................... 706/21
See application file for complete search history.

(56) References Cited

U.S. PATENT DOCUMENTS

| | | |
|---|---|---|
| 6,397,375 B1 | 5/2002 | Block et al. |
| 6,522,186 B2 | 2/2003 | O'Mahony et al. |
| 7,006,962 B1 | 2/2006 | Goyal et al. |
| 7,693,660 B2 | 4/2010 | Diggelen et al. |
| 7,797,664 B2 | 9/2010 | Matsumoto |
| 8,032,301 B2 | 10/2011 | Diggelen et al. |
| 8,825,464 B2 | 9/2014 | Srinivasan |
| 9,739,888 B2 | 8/2017 | Cheng et al. |
| 11,403,444 B1* | 8/2022 | Seluga .................... G06F 30/23 |
| 2010/0218019 A1 | 8/2010 | Eckhard |
| 2011/0213508 A1* | 9/2011 | Mandagere ........... G06F 9/5088 |
| | | 700/291 |
| 2017/0310967 A1 | 10/2017 | Banerjee |
| 2020/0327417 A1* | 10/2020 | Xie ........................ G06F 30/367 |
| 2022/0067481 A1* | 3/2022 | Chhabria ............. G06N 3/0454 |

OTHER PUBLICATIONS

Fang, Yen-Chun, et al. "Machine-learning-based dynamic IR drop prediction for ECO." Proceedings of the international Conference on Computer-Aided Design. ACM, 2018.
Yamato, Yuta, et al. "A fast and accurate per-cell dynamic IR-drop estimation method for at-speed scan test pattern validation." Test Conference (ITC), 2012 IEEE International. IEEE, 2012.

\* cited by examiner

*Primary Examiner* — Mohammed Alam
(74) *Attorney, Agent, or Firm* — Rowan TELS LLC

(57) ABSTRACT

IR drop predictions are obtained using a maximum convolutional neural network. A circuit structure is partitioned into a grid. For cells of the circuit structure in sub-intervals of a clock period, power consumption of the cell is amortized into a set of grid tiles that include portions of the cell, thus forming a set of power maps. The power maps are applied to a neural network to generate IR drop predictions for the circuit structure.

21 Claims, 13 Drawing Sheets

IR DROP PREDICTION WITH MAXIMUM CONVOLUTIONAL NEURAL NETWORK

CROSS-REFERENCE TO RELATED APPLICATIONS

This application claims priority and benefit under 35 USC 119(e) to application Ser. No. 62/831,568, titled "IR DROP PREDICTION WITH MAXIMUM CONVOLUTIONAL NEURAL NETWORK", filed on Apr. 9, 2019, the contents of which are incorporated herein by reference in their entirety.

BACKGROUND

IR drop is the voltage drop induced by current and resistance at the power pin of a logic cell (a sub-circuit of a larger circuit). Specifically, the IR drop may be understood to be the product of current (I) passing through resistance value (R). It leads to a lowering of the available power to the cell and affects the timing behavior of the cell. IR drop becomes increasingly of concern as circuits become smaller and denser. Existing techniques for IR drop prediction for the cells in complex circuits suffer from certain deficiencies, such as high execution complexity or lack of accuracy. There is thus a need for an efficient IR drop prediction mechanism that balances execution complexity and accuracy.

BRIEF SUMMARY

Techniques are disclosed for applying convolutional neural networks to provide IR drop prediction in complex circuits with a reasonable balance of computational complexity and accuracy.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Disclosed herein are embodiments of techniques for prediction of IR drop 'hotspots' (potential circuit failure points). The predictions may be applied to revise circuit structure placements and/or power grid distribution for complex circuits.

Convolutional neural networks (CNNs) are well suited to classifying features in data sets modelled in two or three dimensions. This makes CNNs popular for image classification, because images can be represented in computer memories in three dimensions (two dimensions for width and height, and a third dimension for pixel features like color components and intensity). For example a color JEG image of size 480×480 pixels can be modelled in computer memory using an array that is 480×480×3, where each of the values of the third dimension is a red, green, or blue color component intensity for the pixel ranging from 0 to 255. Inputting this array of numbers to a trained CNN will generate outputs that describe the probability of the image being a certain class (0.80 for cat, 0.15 for dog, 0.05 for bird, etc.). Image classification is the task of taking an input image and outputting a class (a cat, dog, etc.) or a probability of classes that best describes the image.

CNNs typically input data in the form of vectors, pass the data through a series of convolutional transformations, non-linear activation functions, and pooling operations, and pass the results to an output layer to generate the classifications.

CNNs are thus typically utilized for image classification. Unconventionally, a machine learning method and system is disclosed herein to utilize CNNs to perform fast and accurate estimation of IR drop. Cell power consumption is transformed into power maps for different sub-intervals of a clock period and provided as input to the CNN. The CNN architecture transforms the power maps into a maximum-valued output prediction of IR drop 'hot spots'. This structure effectively identifies the logic cells in the circuit structure resulting in worst IR drop during an entire clock cycle.

Logic cell information that may be utilized for IR drop prediction includes cell internal power, cell switching power, cell leakage power, and cell toggle rate. Timing information may also be utilized, such as minimum arriving time for signals at the cell and maximum arriving time for signals at the cell. In some cases, additional cell information may also be utilized, such as cell capacitance, cell slew, cell coordinates after placement, and path resistance. The power characteristics of a cell may be scaled according to the toggle rate. The toggle-rate-scaled cell power is derived as follows: (internal power+switching power+leakage power) *toggle rate.

Herein "cell" refers to a sub-circuit of a larger circuit structure. A cell is often, but not necessarily, defined in a cell library and may be selected and manipulated as a unit along with other cells to build up the larger circuit structure.

Figure 1:
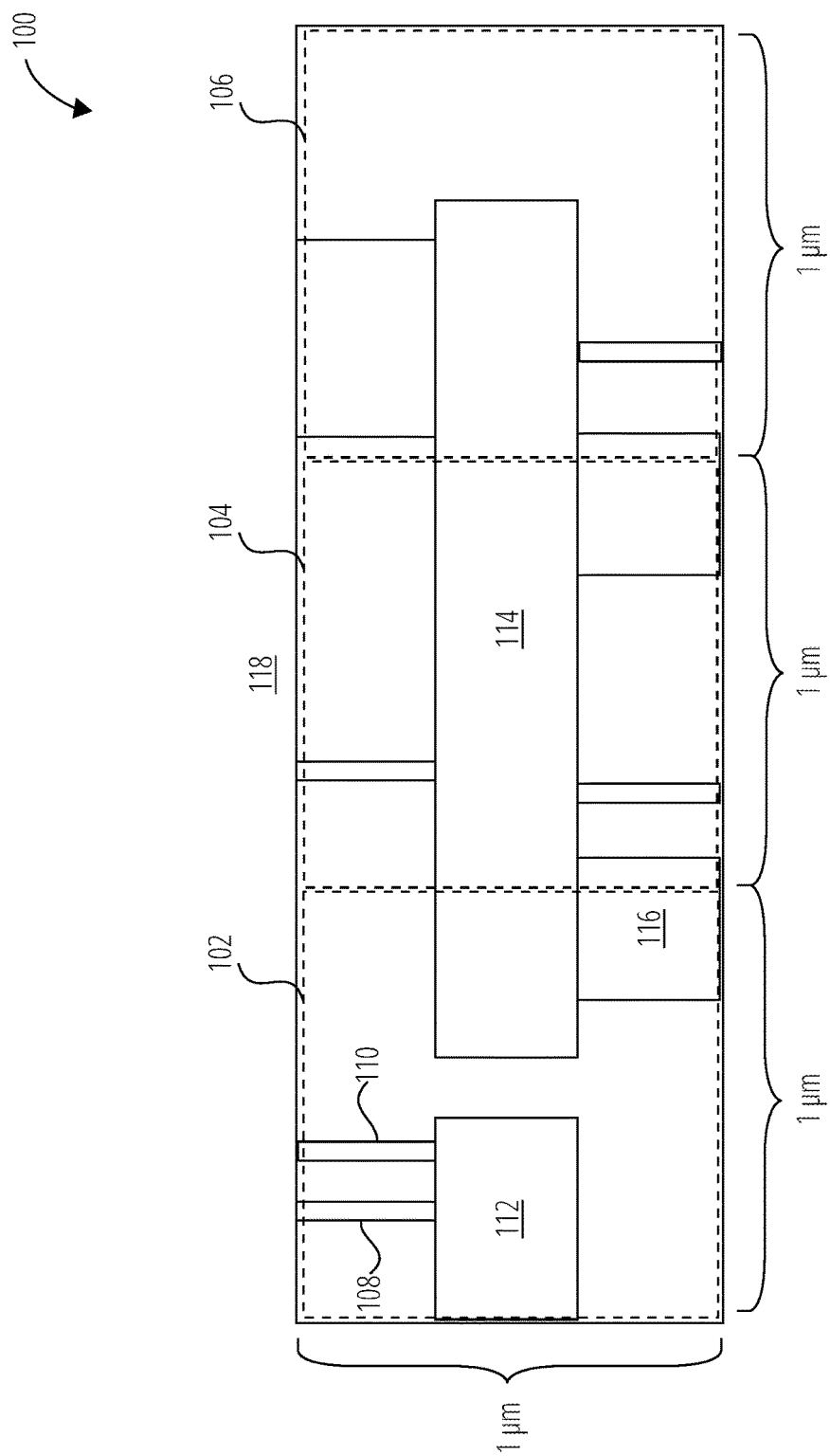
FIG. 1 depicts a partitioned circuit structure 100 in accordance with one embodiment.

Computation complexity is reduced by performing IR drop predictions at a grid-level granularity instead of a cell-level granularity. Cell power is averaged or otherwise amortized over the grid tiles they overlay, even partially, as FIG. 1 depicts in one example. Exemplary grid tile dimensions are 1 um$^2$ although other areas can be used.

Figure 2:
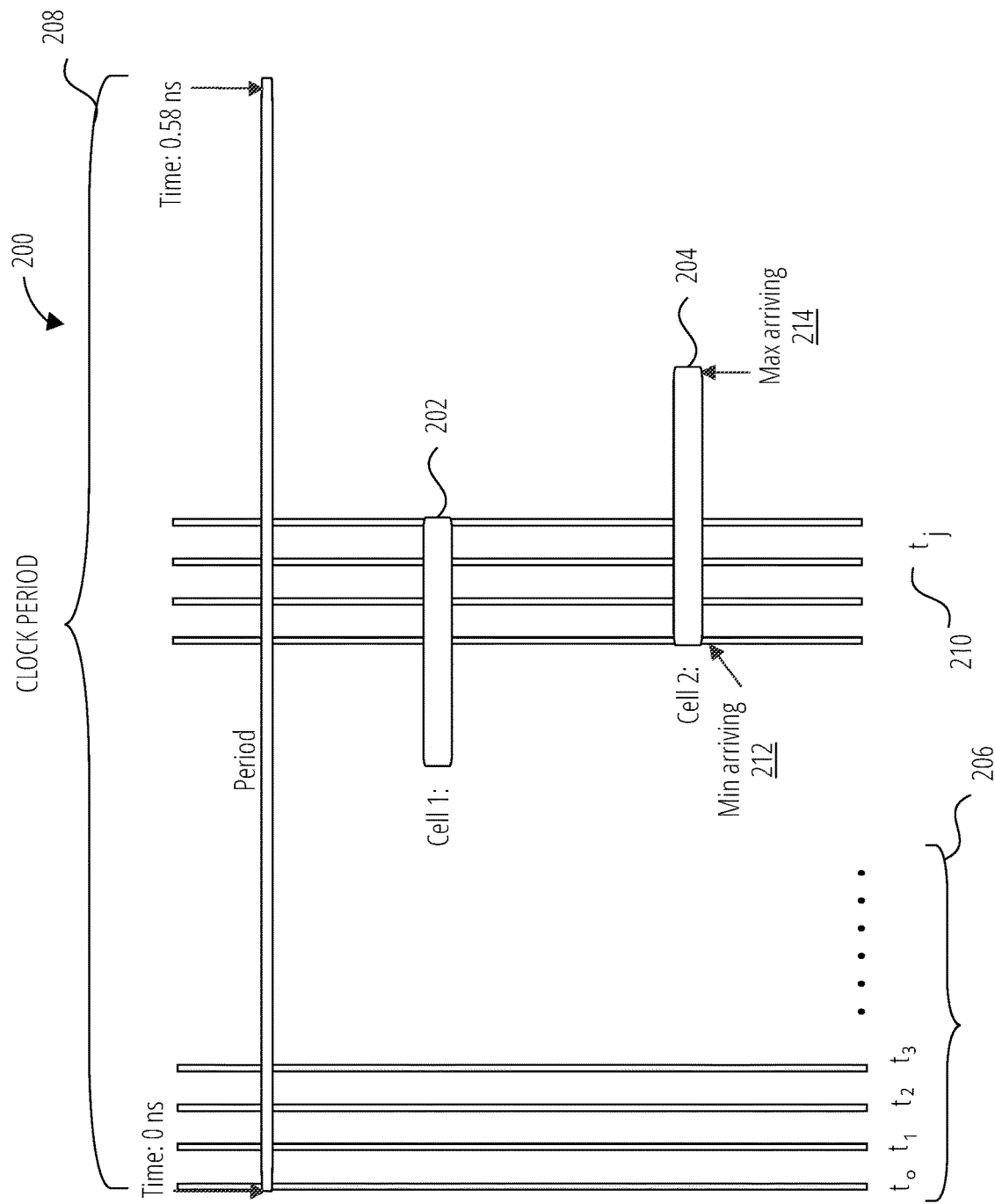
FIG. 2 depicts a timing diagram 200 in accordance with one embodiment.

The power consumption of a particular cell is mapped into N≥2 power maps for N≥2 timing window sub-intervals of the cell in a single clock period. Each power map is assigned a unique time point in the clock period. The N time points span the clock period of the circuit under evaluation, and time points of each pair of neighboring maps have the same time discrepancy (separation interval), as depicted in FIG. 2. For each power map, each cell is analyzed and the cell power is added to the power map in the grid tiles overlaid by the cell when the sub-interval for the power map falls within the cell's timing window. For example, in FIG. 2, during time intervals $t_0$ to $t_3$, the power for cell 1 and for cell 2 is not contributive. However the power for these cells is contributive to time interval $t_j$ because $t_j$ overlaps the operational timing window of those two cells. In this way, every power map only includes the power of cells that activate at or within the corresponding sub-interval in the clock period.

If a cell is active in a particular sub-interval, the power consumed and/or dissipated by that cell may be amortized (e.g., averaged) into each grid tile that the cell overlaps in the power map for that sub-interval. This allows for the grid lines to be drawn uniformly, without consideration of how they cut through the cells. For example, if a cell overlaps three grid tiles, it's power may be treated as contributing equally to each of them, regardless of how much or little of the cell circuitry actually contributes power in each overlapped grid tile. In this case, each grid tile may be apportioned a third of the power contribution from that cell during a sub-interval that the cell is turned on. In other embodiments, the cell contribution to each grid tile may be apportioned based on a characterization of the internals of that cell. This approach, though more computationally complex, may improve the accuracy of the IR drop predictions. Cell characterization may be based on the positions of transistors, internal power number, and leakage power number, for example. Simulations of the cell may also be generated to determine where within the cell powers is consumed or dissipated, and to what extent.

Figure 3:
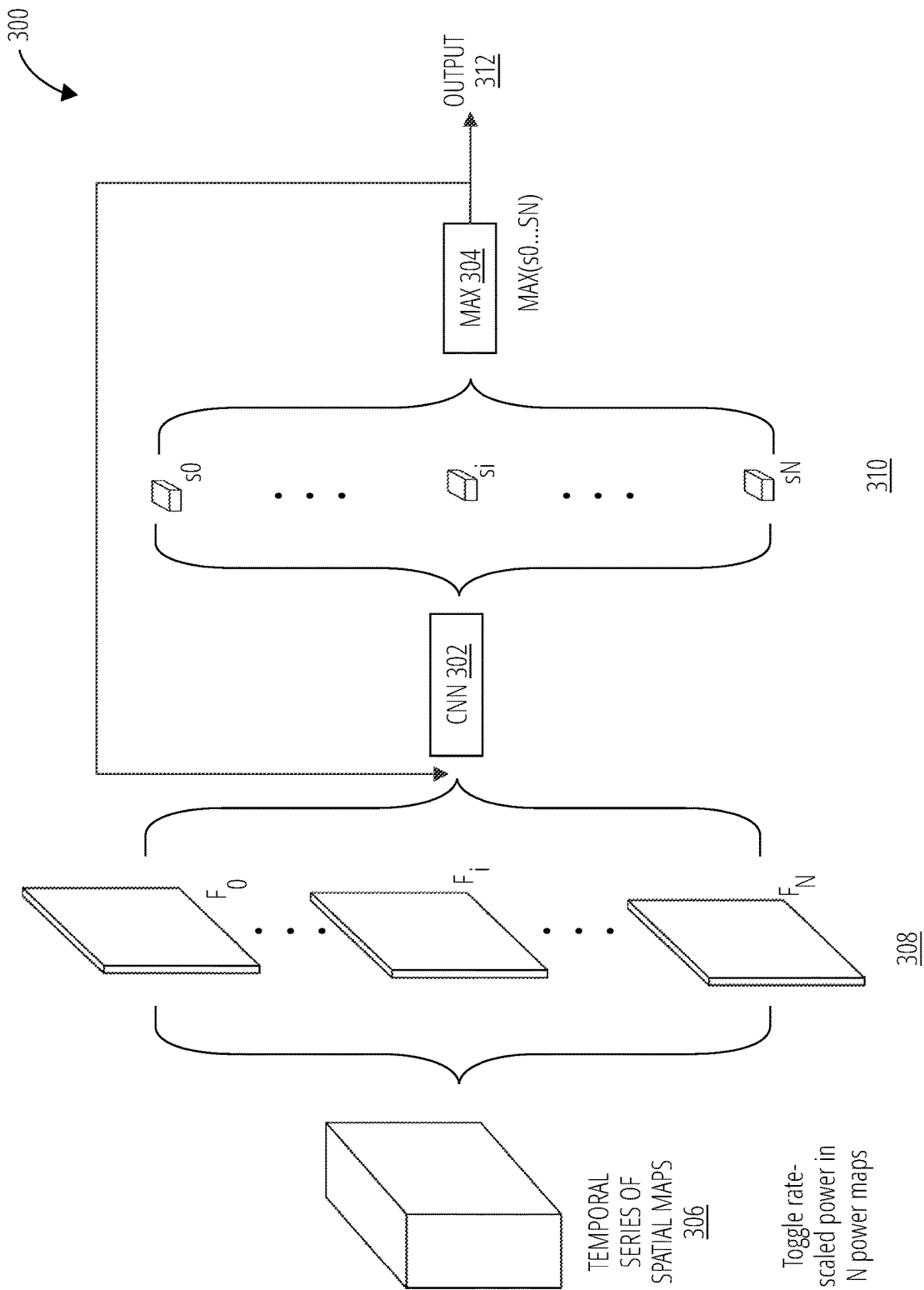
FIG. 3 depicts a machine learning and inference system 300 in accordance with one embodiment.

FIG. 3 depicts a CNN architecture to process a sequence of power maps. Each sub-interval $t_i$ within the clock period from FIG. 2 has a corresponding input power map composed of grid tiles, e.g., a set of 30×30 tiles. The CNN processes the power maps for all sub-intervals and selects the maximum or highest valued subset of output results as the final IR drop prediction(s).

Figure 4:
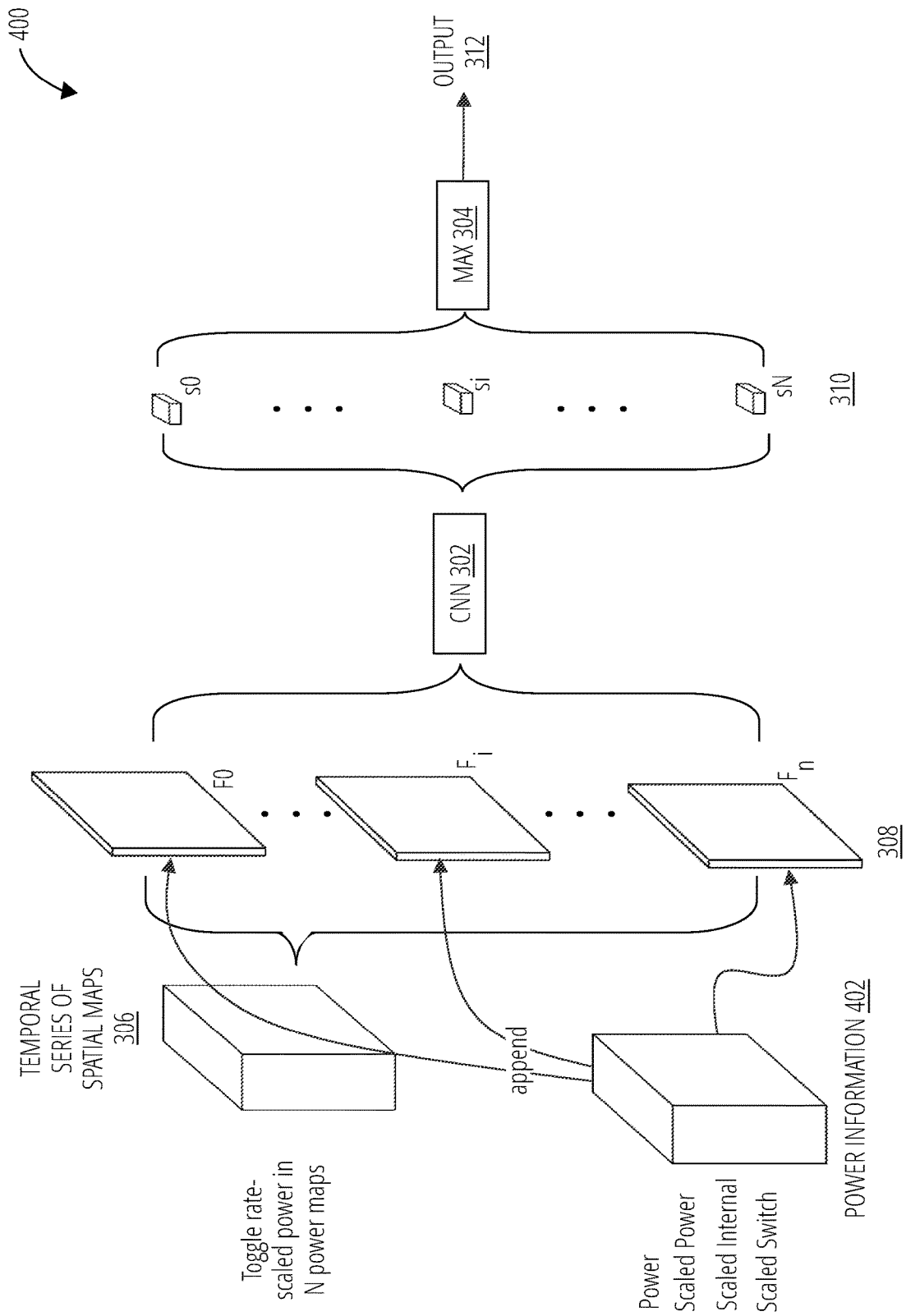
FIG. 4 depicts a machine learning and inference system 400 in accordance with one embodiment.

Additional power information may be included in the depth of each power map input to the CNN, as FIG. 4 shows. The additional power information may result in a more complex but more accurate computation of IR drop.

FIG. 1 depicts an example partitioned circuit structure 100 partitioned into a grid 118 comprising grid tiles (grid tile 102, grid tile 104, and grid tile 106). The partitioned circuit structure 100 includes a plurality of cells with some spanning between grid tiles. A power map is formed for the grid 118 by amortizing the power consumption of the cells within the set of grid tiles that comprise portions of the cells, during each sub-interval of a clock period. For example, grid tile 102 may power cell P1 108, cell P2 110, and cell P3 112 as well as cell P4 114 and cell P5 116 during one sub-interval of the clock period, referred to herein as a window or power window. Because portions of cell P4 114 are included in grid tile 102, grid tile 104, and grid tile 106, the power consumption representation for cell P4 114 in each of those grid tiles is divided by three. Because portions of cell P5 116 are included within grid tile 102 and grid tile 104, the power consumption representation of the cell P5 116 in each of those grid tiles is divided by two. The total power consumption for grid tile 102 during the power window is thus the sum of these contributions: $P_{tile} = P1 + P2 + P3 + P4/3 + P5/2$. A similar calculation is performed for each grid tile (grid tile 102, grid tile 104, and grid tile 106) during the power window, and the total power for each grid tile of the grid 118 is formulated as a matrix in the form of a power map for the power window.

In the partitioned circuit structure 100, each of the grid tiles have a width and height of 1 µm making the area of the grid tiles 1 µm$^2$. In some embodiments, the grid tiles may not all have the same dimensions, which leads to a more complex but potentially more accurate CNN model. The grid tile area may be selected based on a trade off between computational complexity versus precision in the calculations and may be set to larger or smaller dimensions, depending on the circuit structure.

In some embodiments, the grid tiles may be non-homogenous and may be based on characteristics of the overall circuit that may be determined through profiling. The non-homogenous configuration of the grid sizes may be determined by a set of rules that are applied to all power maps utilized in training the CNN. In one embodiment, there may be a fixed grid configuration for each power map, and within each power map, the grid tiles may be non-homogeneously sized. For example, the grid tile size may be adjusted to finer resolution (in all power maps) around power rails that are more likely to correspond to IR hotspots. The non-homogenous configuration may be defined in a feature map separately from the power maps, and this feature map may be incorporated into the convolutional filter structure of the neural network.

FIG. 2 depicts a timing diagram 200 for cells 1 and 2 during a clock period 208 that last from 0.0 ns to 0.58 ns. Cell 1 and Cell 2 do not switch during the time intervals 206 within the clock period 208 because their switching windows (switching window 202 and switching window 204 for Cell 1 and Cell 2, respectively) do not overlap those time intervals. At time interval 210 ($t_j$) both of switching window 202 and switching window 204 indicate that Cell 1 and Cell 2 are powered and the power contributions of those cells to various grid tiles that they overlap are included in the power map for time interval 210. The switching window 204 may begin at the time interval 212 and end at time interval 214.

In this manner, for each sub-interval of the clock period, a power map may be produced by calculating the total power contributed by the cells of the circuit into each grid tile. This results in a temporal series of spatially organized matrices over the clock period. The temporal series of spatial maps reflect the cells that are powered during each of the sub-intervals and that thus contribute to the total power of particular grid tiles at different sub-intervals of the clock period.

Consider the example of a power map comprising a 30×30 set of grid tiles. At every sub-interval of the clock period ($t_0$ $t_1$ $t_2$, etc.,) another 30×30 grid (these dimensions may vary by implementation) may be generated. Within each grid, only the contributions from the cells that are turned on and activated at that sub-interval of the clock period are contributive to the total power in each grid tile. In other words, the cells whose switching windows coincide with that sub-intervals are counted for the total power calculations for the grid tiles in the power map.

FIG. 3 depicts a machine learning and inference system 300 in which a convolutional neural network (convolutional neural network 302) transforms power maps into IR drop predictions. A temporal series of spatial maps 306 is formed that includes power maps 308 where the index N corresponds to the time interval of a particular power map. The power maps 308 are then input to the convolutional neural network 302 which outputs scalar IR drop predictions 310 subject to a MAX operator 304. The MAX operator 304 selects the maximum value of the scalar IR drop predictions 310 in order to generate the (scalar) output 312. Backpropagation of the output 312 and is then utilized to train the convolutional neural network 302. The power map for each time interval is indicated by 'F' and a time interval index.

In some configurations, the convolutional neural network 302 may be configured with four convolutional layers, two pooling layers, and two fully connected layers. The convolutional neural network 302 may be implemented as a 2D model. The pooling layers may utilize Maxpooling.

Thus, techniques for generating IR drop predictions for a circuit structure may involve generating power maps for a circuit structures that are utilized to train a neural network. The power maps may be generated by partitioning a circuit structure into a grid comprising grid tiles. Then, for each cell of the circuit structure and for each sub-interval of a clock period, the power consumption of the cells may be amortized into a set of grid tiles that comprise portions of the cells, thus forming a set of power maps. These power maps may then be applied to a neural network to generate one or more IR drop prediction for the circuit structure during the clock period.

In some configurations, the neural network is a convolutional neural network. The process of amortizing the power consumption of the cell may involve dividing the power consumption of the cell evenly (averaging) into each tile of the set of grid tiles that comprises a portion of the cell. The IR drop predictions of the neural network may include a single maximal output of the neural network for the set of power maps.

In some configurations, the grid tiles may have uniform dimensions. The power consumption metrics for a cell may include cell internal power, cell switching power, cell leakage power, and cell toggle rate. The neural network may in some embodiments include at least four convolutional layers, two pooling layers, and two fully-connected layers.

A system generating IR drop predictions for a circuit structure may thus include a power map generator for a circuit structure, and a neural network. The neural network may be coupled to receive a set of power maps from the power map generator and to transform the set of power maps into a maximal IR drop prediction for the circuit structure in a clock period. The power map generator may be configured to partition the circuit structure into a grid comprising grid tiles and for each of N sub-intervals of the clock period and to amortize a power consumption of the logic cells into one or more of the grid tiles that includes at least a portion the cells, thus forming the set of power maps.

In some configurations, the power map generator may be further configured to append to the power maps at least: sub-interval-independent values for scaled power, scaled internal power, and scaled switching power.

In some configurations, the neural network comprises at least two Maxpooling layers, and/or utilize batch normalization, and/or apply backpropagation.

FIG. 4 depicts a machine learning and inference system 400, a modified version of the machine learning and inference system 300 that appends four additional values to the tensors for power, scaled power, scaled internal power, and scaled switch power for each interval of the power maps 308 from a set of power maps 402. The appended values for power, scaled powers, scaled internal power, and the scaled switched power are calculated independently of the timing window. The appended values are thus the same for power maps at different time intervals. The higher dimensionality of the power maps 308 in the machine learning and inference system 400 may yield more accurate results but may utilize greater computational resources.

In this manner "undecomposed" power information may be included in each power map. "Decomposed" power information refers to the allocation of power consumption by cells into different sub-intervals of the clock cycle, whereas "undecomposed" power information refers to the power consumption of cells across the entire clock cycle. The undecomposed power information may function as a depth parameter when the power map is vectorized for input to the neural network. The undecomposed power information may thus be formed into a depth channel of the power map inputs to the neural network.

The scaling of the undecomposed power information may be based on the toggle rate. These are not instantaneous power values but rather function as coefficients that characterize the overall behavior of the circuit.

For instance, the total power may be computed from all the cells in a grid and the sum of all the powers may correspond to the switching power consumed by the circuit during the clock cycle. Switching may not occur in every timing window, and this fact may be utilized to generate a scaling factor. For instance, if switching occurs 50% of the time during the clock cycle, the scaling factor would be 0.5.

The undecomposed power information may provide insight into behavior beyond instantaneous power values. The undecomposed power information may take into account behaviors of the circuit as it may function in actual use case scenarios. By utilizing a scaling factor with undecomposed power information, a more accurate representation of the circuit's power behavior may be provided to the neural network.

Figure 5:
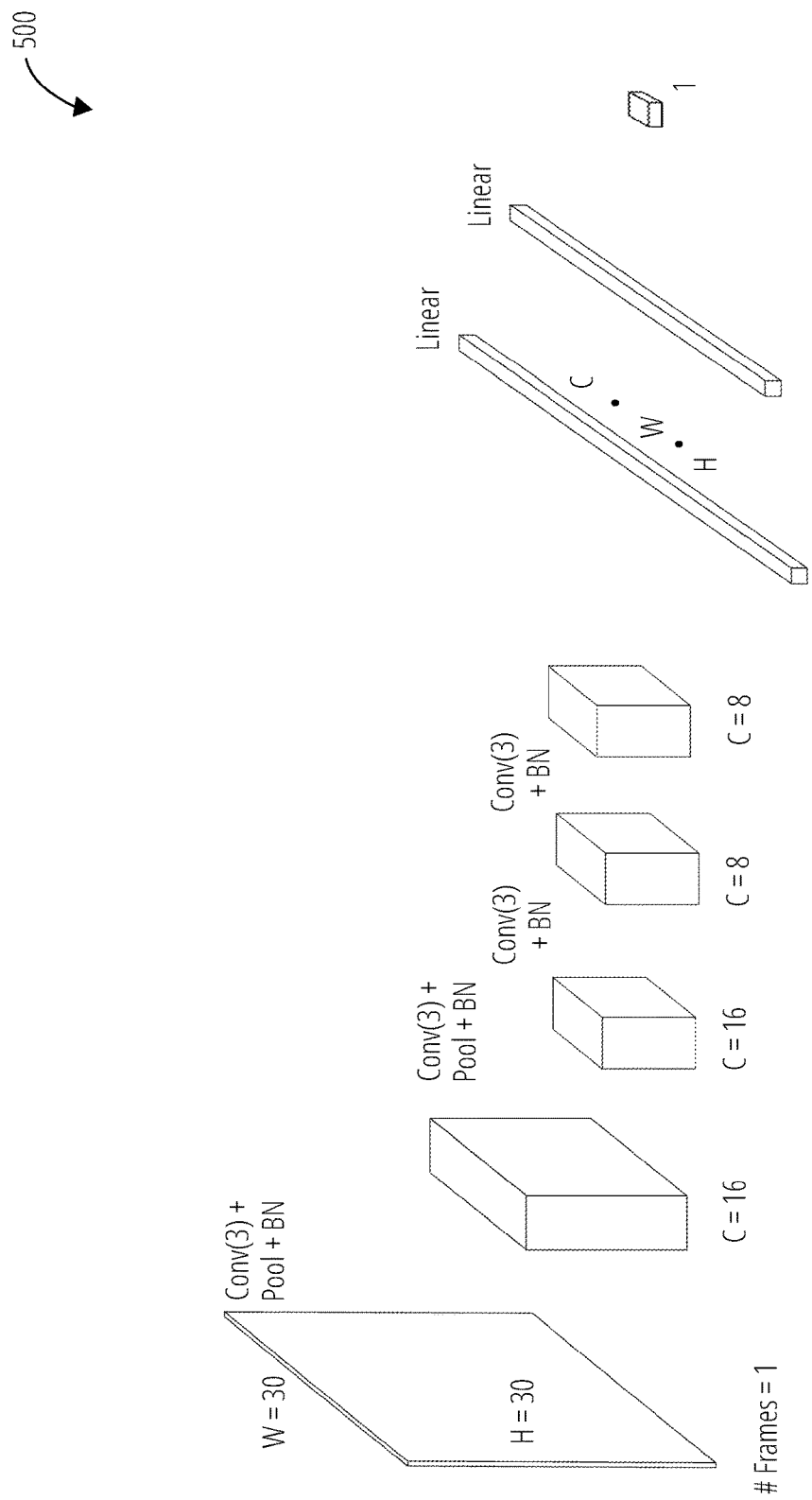
FIG. 5 depicts a deep neural network 500 in accordance with one embodiment.

FIG. 5 depicts a deep neural network 500 showing the detailed structure of one embodiment of a CNN. It has four convolutional layers, two pooling layers and two fully connected layers. Batch Normalization is adopted. L1 loss and an Adam optimizer are used for backpropagation.

Figure 6:
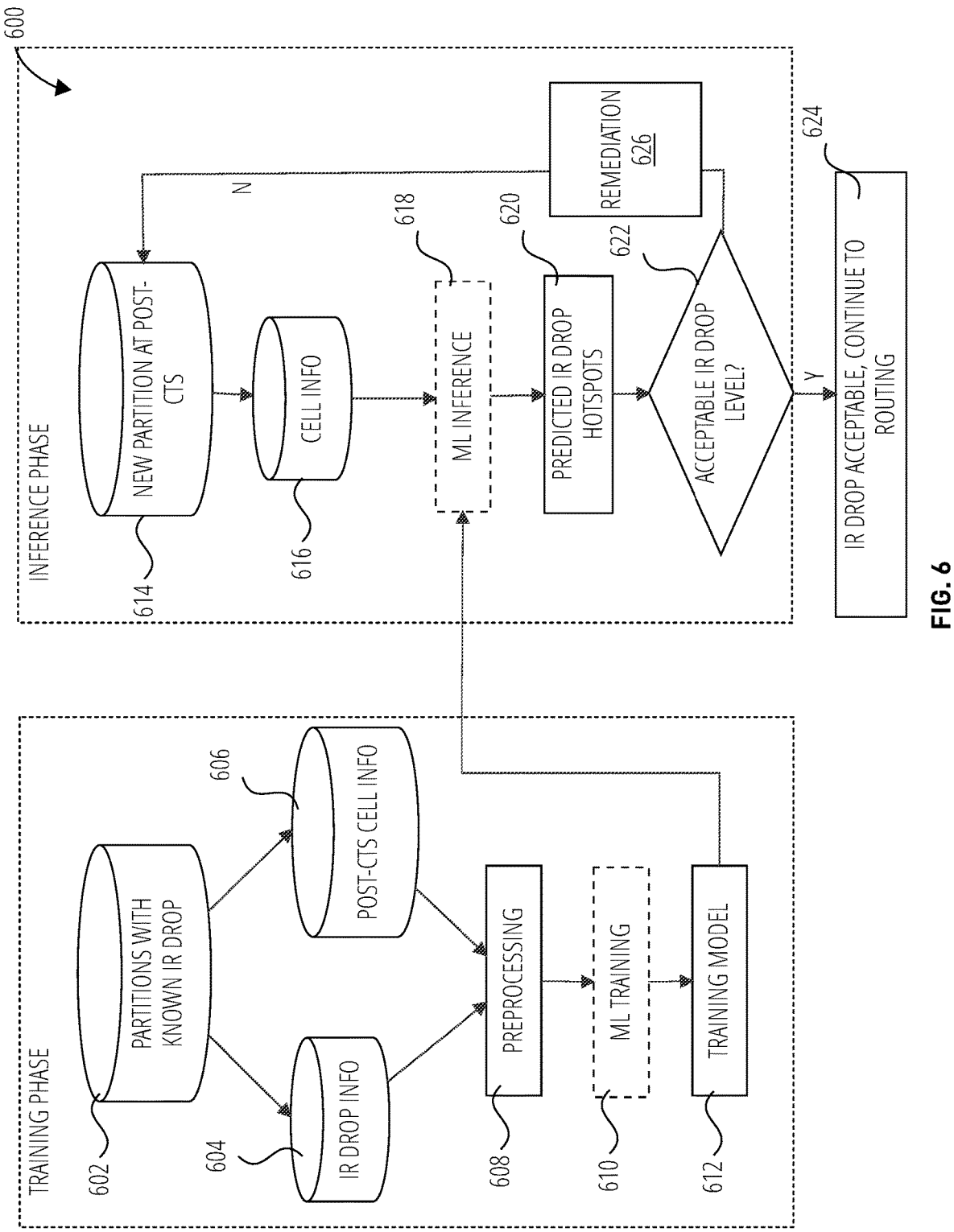
FIG. 6 depicts a process 600 in accordance with one embodiment.

FIG. 6 depicts a process 600 to repair an excessive IR drop in a circuit utilizing the described machine learning model. The process 600 may be utilized to remediate IR drop hotspots during any physical circuit design stage. In the process 600 the neural network prediction is utilized at the post-CTS (clock tree synthesis) stage.

The neural network may be trained (pre-processing logic 608, machine learning training logic 610) on a learning set of existing circuit partitions (partition training set 602) with known IR drop information 604 and known cell information 606, for example as generated by Seahawk™ simulation, to generate a training model 612. After training, a machine inference 618 engine such as a convolutional neural network is applied to predict hotspot locations for IR drop remediation based on cell information 616 in one or more partition to analyze 614. This results in IR drop predictions 620 that are used to perform an IR drop threshold test 622. For small regions with high IR drop, the layout of cells within the region may be adjusted or spread out. For large regions of high IR drop, the power grid distribution may be adjusted to lessen the IR drop or concentration of IR drop. The machine inference 618 learns and updates its predictions until the IR drop becomes acceptable. Once IR drop remediation 626 is performed, inference continues to other partitions, and when acceptable IR drop levels are achieved throughout the circuit, the partition design continues to the routing phase 624.

Thus, techniques for training a neural network may involve generating a partitioned training set comprising power maps for a circuit structure. The power maps may be generated by partitioning the circuit structure into a grid comprising grid tiles. Then, for each cell of the circuit structure and for each of N≥2 sub-intervals of a clock period, the power consumption of each cell may be amortized into those grid tiles that comprise at least a portion of the cell, thus forming a set of power maps. Once the power maps are generated, they may be applied to the neural network to generate a maximal IR drop prediction for the circuit structure in the clock period. The neural network training may be performed with a training set of circuit structures with known IR drop characteristics. The neural network may also be trained with power information about the cells generated from a simulation of the cells.

In some instances, the maximal IR drop prediction generated by the neural network for a circuit structure in a clock period may be compared to a configured acceptable level of IR drop. The configured acceptable level of IR drop may function as part of an IR drop threshold test. On condition that the predictions are acceptable and/or remediated such that the maximal IR drop prediction meets the acceptable level of IR drop, the process may continue to a routing phase for generating the routing for the circuit structure.

In some instances, the process may enhance the power maps with sub-interval-independent values for scaled power, scaled internal power, and scaled switching power for the cells.

The machine inference 618 need not be applied post-CTS and before routing in all cases. In other embodiments, the machine inference 618 may be applied after logic block placement to adjust the power grid distribution or standard cell density in a region of the circuit before proceeding to CTS. Generally, there are many points in the circuit placement-and-routing process flow where the process 600 could be applied wholly or in part.

Various aspects of the techniques disclosed herein may be carried out by one or more systems utilizing general purpose processors and/or graphics processing units, as further described below. For example, generation of the partitioned circuit structure 100, implementation of the machine learning and inference system 300, machine learning and inference system 400, deep neural network 500, or process 600, or particular aspects thereof, may be embodied using systems and components described below, in manners known in the art.

The processes and systems disclosed herein may be implemented by computing devices utilizing one or more graphic processing unit (GPU) and/or general purpose data processor (e.g., a 'central processing unit or CPU). Exemplary machine systems will now be described.

The following description may use certain acronyms and abbreviations as follows:
"DPC" refers to a "data processing cluster";
"GPC" refers to a "general processing cluster";
"I/O" refers to a "input/output";
"L1 cache" refers to "level one cache";
"L2 cache" refers to "level two cache";
"LSU" refers to a "load/store unit";
"MMU" refers to a "memory management unit";
"MPC" refers to an "M-pipe controller";
"PPU" refers to a "parallel processing unit";
"PROP" refers to a "pre-raster operations unit";
"ROP" refers to a "raster operations";
"SFU" refers to a "special function unit";
"SM" refers to a "streaming multiprocessor";
"Viewport SCC" refers to "viewport scale, cull, and clip";
"WDX" refers to a "work distribution crossbar"; and
"XBar" refers to a "crossbar".

Parallel Processing Unit

Figure 7:
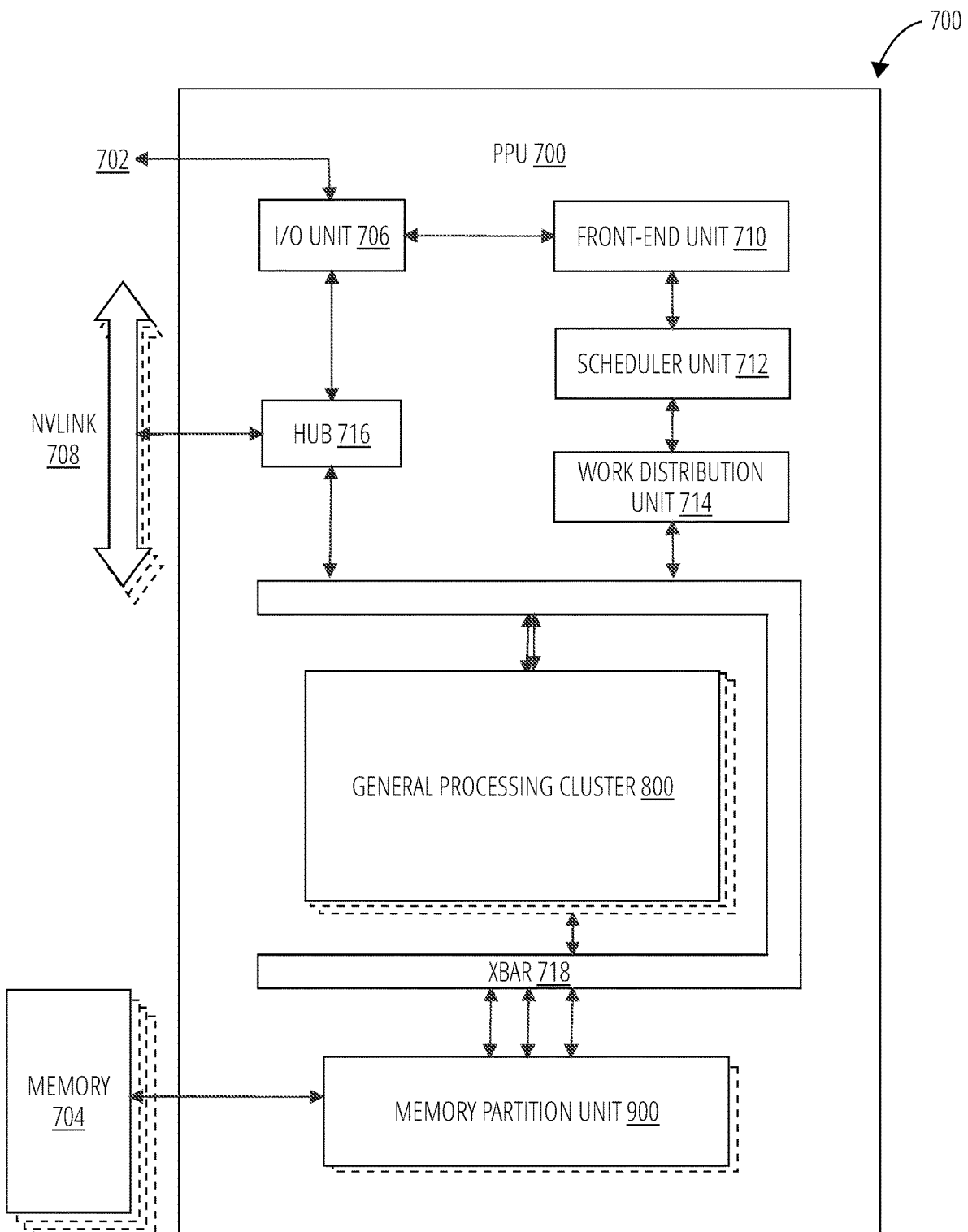
FIG. 7 depicts a parallel processing unit 700 in accordance with one embodiment.

FIG. 7 depicts a parallel processing unit 700, in accordance with an embodiment. In an embodiment, the parallel processing unit 700 is a multi-threaded processor that is implemented on one or more integrated circuit devices. The parallel processing unit 700 is a latency hiding architecture designed to process many threads in parallel. A thread (e.g., a thread of execution) is an instantiation of a set of instructions configured to be executed by the parallel processing unit 700. In an embodiment, the parallel processing unit 700 is a graphics processing unit (GPU) configured to implement a graphics rendering pipeline for processing three-dimensional (3D) graphics data in order to generate two-dimensional (2D) image data for display on a display device such as a liquid crystal display (LCD) device. In other embodiments, the parallel processing unit 700 may be utilized for performing general-purpose computations. While one exemplary parallel processor is provided herein for illustrative purposes, it should be strongly noted that such processor is set forth for illustrative purposes only, and that any processor may be employed to supplement and/or substitute for the same.

One or more parallel processing unit 700 modules may be configured to accelerate thousands of High Performance Computing (HPC), data center, and machine learning applications. The parallel processing unit 700 may be configured to accelerate numerous deep learning systems and applications including autonomous vehicle platforms, deep learning, high-accuracy speech, image, and text recognition systems, intelligent video analytics, molecular simulations, drug discovery, disease diagnosis, weather forecasting, big data analytics, astronomy, molecular dynamics simulation, financial modeling, robotics, factory automation, real-time language translation, online search optimizations, and personalized user recommendations, and the like.

As shown in FIG. 7, the parallel processing unit 700 includes an I/O unit 706, a front-end unit 710, a scheduler unit 712, a work distribution unit 714, a hub 716, a crossbar 718, one or more general processing cluster 800 modules, and one or more memory partition unit 900 modules. The parallel processing unit 700 may be connected to a host processor or other parallel processing unit 700 modules via one or more high-speed NVLink 708 interconnects. The parallel processing unit 700 may be connected to a host processor or other peripheral devices via an interconnect 702. The parallel processing unit 700 may also be connected to a local memory comprising a number of memory 704 devices. In an embodiment, the local memory may comprise a number of dynamic random access memory (DRAM) devices. The DRAM devices may be configured as a high-bandwidth memory (HBM) subsystem, with multiple DRAM dies stacked within each device. The memory 704 may comprise logic to configure the parallel processing unit 700 to carry out aspects of the techniques disclosed herein.

The NVLink 708 interconnect enables systems to scale and include one or more parallel processing unit 700 modules combined with one or more CPUs, supports cache coherence between the parallel processing unit 700 modules and CPUs, and CPU mastering. Data and/or commands may be transmitted by the NVLink 708 through the hub 716 to/from other units of the parallel processing unit 700 such as one or more copy engines, a video encoder, a video decoder, a power management unit, etc. (not explicitly shown). The NVLink 708 is described in more detail in conjunction with FIG. 11.

The I/O unit 706 is configured to transmit and receive communications (e.g., commands, data, etc.) from a host processor (not shown) over the interconnect 702. The I/O unit 706 may communicate with the host processor directly via the interconnect 702 or through one or more intermediate devices such as a memory bridge. In an embodiment, the I/O unit 706 may communicate with one or more other processors, such as one or more parallel processing unit 700 modules via the interconnect 702. In an embodiment, the I/O unit 706 implements a Peripheral Component Interconnect Express (PCIe) interface for communications over a PCIe bus and the interconnect 702 is a PCIe bus. In alternative embodiments, the I/O unit 706 may implement other types of well-known interfaces for communicating with external devices.

The I/O unit 706 decodes packets received via the interconnect 702. In an embodiment, the packets represent commands configured to cause the parallel processing unit 700 to perform various operations. The I/O unit 706 transmits the decoded commands to various other units of the parallel processing unit 700 as the commands may specify. For example, some commands may be transmitted to the front-end unit 710. Other commands may be transmitted to the hub 716 or other units of the parallel processing unit 700 such as one or more copy engines, a video encoder, a video decoder, a power management unit, etc. (not explicitly shown). In other words, the I/O unit 706 is configured to route communications between and among the various logical units of the parallel processing unit 700.

In an embodiment, a program executed by the host processor encodes a command stream in a buffer that provides workloads to the parallel processing unit 700 for processing. A workload may comprise several instructions and data to be processed by those instructions. The buffer is a region in a memory that is accessible (e.g., read/write) by both the host processor and the parallel processing unit 700. For example, the I/O unit 706 may be configured to access the buffer in a system memory connected to the interconnect 702 via memory requests transmitted over the interconnect 702. In an embodiment, the host processor writes the command stream to the buffer and then transmits a pointer to the start of the command stream to the parallel processing unit 700. The front-end unit 710 receives pointers to one or more command streams. The front-end unit 710 manages the one or more streams, reading commands from the streams and forwarding commands to the various units of the parallel processing unit 700.

The front-end unit 710 is coupled to a scheduler unit 712 that configures the various general processing cluster 800 modules to process tasks defined by the one or more streams. The scheduler unit 712 is configured to track state information related to the various tasks managed by the scheduler unit 712. The state may indicate which general processing cluster 800 a task is assigned to, whether the task is active or inactive, a priority level associated with the task, and so forth. The scheduler unit 712 manages the execution of a plurality of tasks on the one or more general processing cluster 800 modules.

The scheduler unit 712 is coupled to a work distribution unit 714 that is configured to dispatch tasks for execution on the general processing cluster 800 modules. The work distribution unit 714 may track a number of scheduled tasks received from the scheduler unit 712. In an embodiment, the work distribution unit 714 manages a pending task pool and an active task pool for each of the general processing cluster 800 modules. The pending task pool may comprise a number of slots (e.g., 32 slots) that contain tasks assigned to be processed by a particular general processing cluster 800. The active task pool may comprise a number of slots (e.g., 4 slots) for tasks that are actively being processed by the general processing cluster 800 modules. As a general processing cluster 800 finishes the execution of a task, that task is evicted from the active task pool for the general processing cluster 800 and one of the other tasks from the pending task pool is selected and scheduled for execution on the general processing cluster 800. If an active task has been idle on the general processing cluster 800, such as while waiting for a data dependency to be resolved, then the active task may be evicted from the general processing cluster 800 and returned to the pending task pool while another task in the pending task pool is selected and scheduled for execution on the general processing cluster 800.

The work distribution unit 714 communicates with the one or more general processing cluster 800 modules via crossbar 718. The crossbar 718 is an interconnect network that couples many of the units of the parallel processing unit 700 to other units of the parallel processing unit 700. For example, the crossbar 718 may be configured to couple the work distribution unit 714 to a particular general processing cluster 800. Although not shown explicitly, one or more other units of the parallel processing unit 700 may also be connected to the crossbar 718 via the hub 716.

The tasks are managed by the scheduler unit 712 and dispatched to a general processing cluster 800 by the work distribution unit 714. The general processing cluster 800 is configured to process the task and generate results. The results may be consumed by other tasks within the general processing cluster 800, routed to a different general processing cluster 800 via the crossbar 718, or stored in the memory 704. The results can be written to the memory 704 via the memory partition unit 900 modules, which implement a memory interface for reading and writing data to/from the memory 704. The results can be transmitted to another parallel processing unit 700 or CPU via the NVLink 708. In an embodiment, the parallel processing unit 700 includes a number U of memory partition unit 900 modules that is equal to the number of separate and distinct memory 704 devices coupled to the parallel processing unit 700. A memory partition unit 900 will be described in more detail below in conjunction with FIG. 9.

In an embodiment, a host processor executes a driver kernel that implements an application programming interface (API) that enables one or more applications executing on the host processor to schedule operations for execution on the parallel processing unit 700. In an embodiment, multiple compute applications are simultaneously executed by the parallel processing unit 700 and the parallel processing unit 700 provides isolation, quality of service (QoS), and independent address spaces for the multiple compute applications. An application may generate instructions (e.g., API calls) that cause the driver kernel to generate one or more tasks for execution by the parallel processing unit 700. The driver kernel outputs tasks to one or more streams being processed by the parallel processing unit 700. Each task may comprise one or more groups of related threads, referred to herein as a warp. In an embodiment, a warp comprises 32 related threads that may be executed in parallel. Cooperating threads may refer to a plurality of threads including instructions to perform the task and that may exchange data through shared memory. Threads and cooperating threads are described in more detail in conjunction with FIG. 10.

Figure 8:
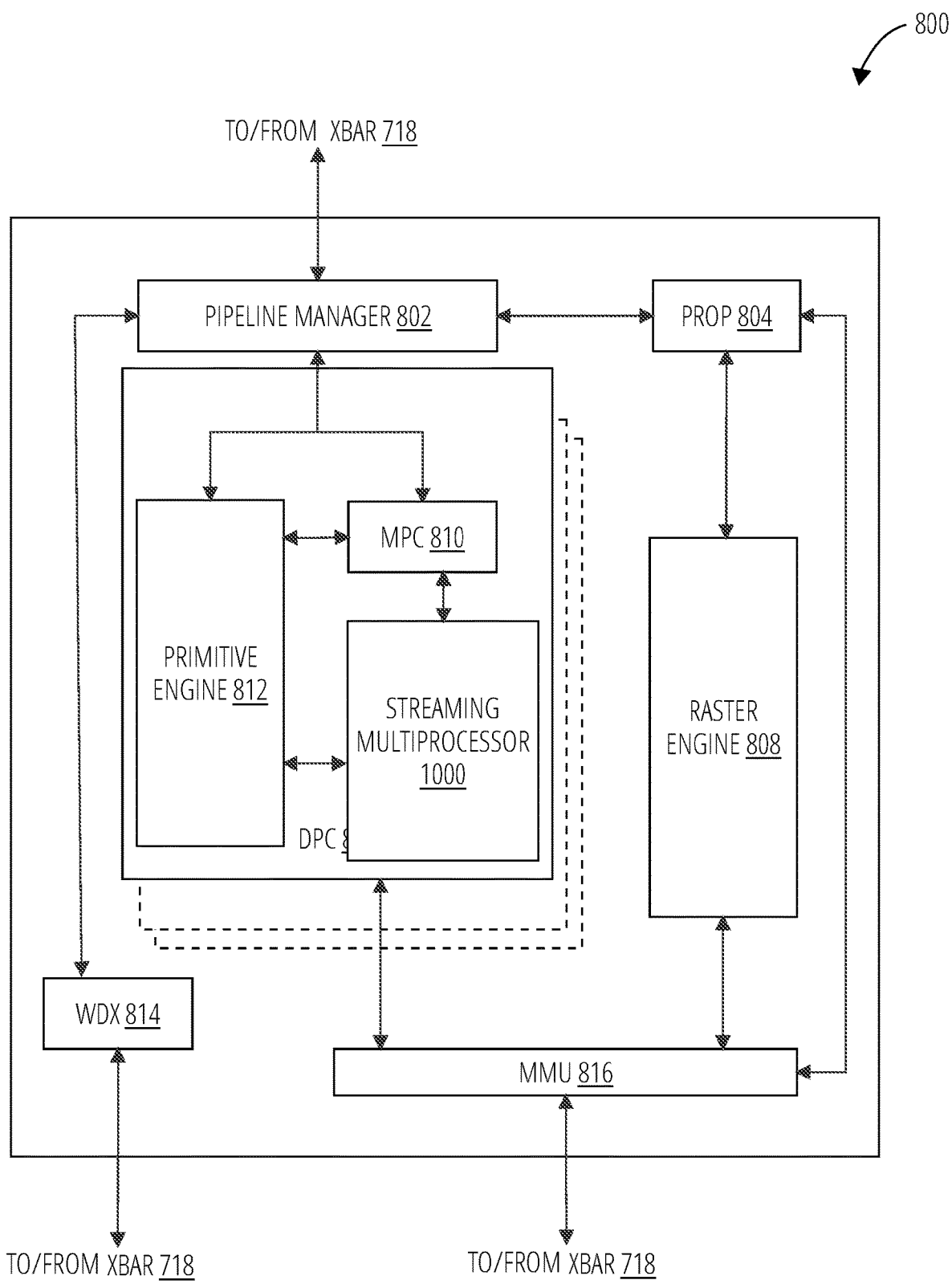
FIG. 8 depicts a general processing cluster 800 in accordance with one embodiment.

FIG. 8 depicts a general processing cluster 800 of the parallel processing unit 700 of FIG. 7, in accordance with an embodiment. As shown in FIG. 8, each general processing cluster 800 includes a number of hardware units for processing tasks. In an embodiment, each general processing cluster 800 includes a pipeline manager 802, a pre-raster operations unit 804, a raster engine 808, a work distribution crossbar 814, a memory management unit 816, and one or more data processing cluster 806. It will be appreciated that the general processing cluster 800 of FIG. 8 may include other hardware units in lieu of or in addition to the units shown in FIG. 8.

In an embodiment, the operation of the general processing cluster 800 is controlled by the pipeline manager 802. The pipeline manager 802 manages the configuration of the one or more data processing cluster 806 modules for processing tasks allocated to the general processing cluster 800. In an embodiment, the pipeline manager 802 may configure at least one of the one or more data processing cluster 806 modules to implement at least a portion of a graphics rendering pipeline. For example, a data processing cluster 806 may be configured to execute a vertex shader program on the programmable streaming multiprocessor 1000. The pipeline manager 802 may also be configured to route packets received from the work distribution unit 714 to the appropriate logical units within the general processing cluster 800. For example, some packets may be routed to fixed function hardware units in the pre-raster operations unit 804 and/or raster engine 808 while other packets may be routed to the data processing cluster 806 modules for processing by the primitive engine 812 or the streaming multiprocessor 1000. In an embodiment, the pipeline manager 802 may configure at least one of the one or more data processing cluster 806 modules to implement a neural network model and/or a computing pipeline.

Figure 9:
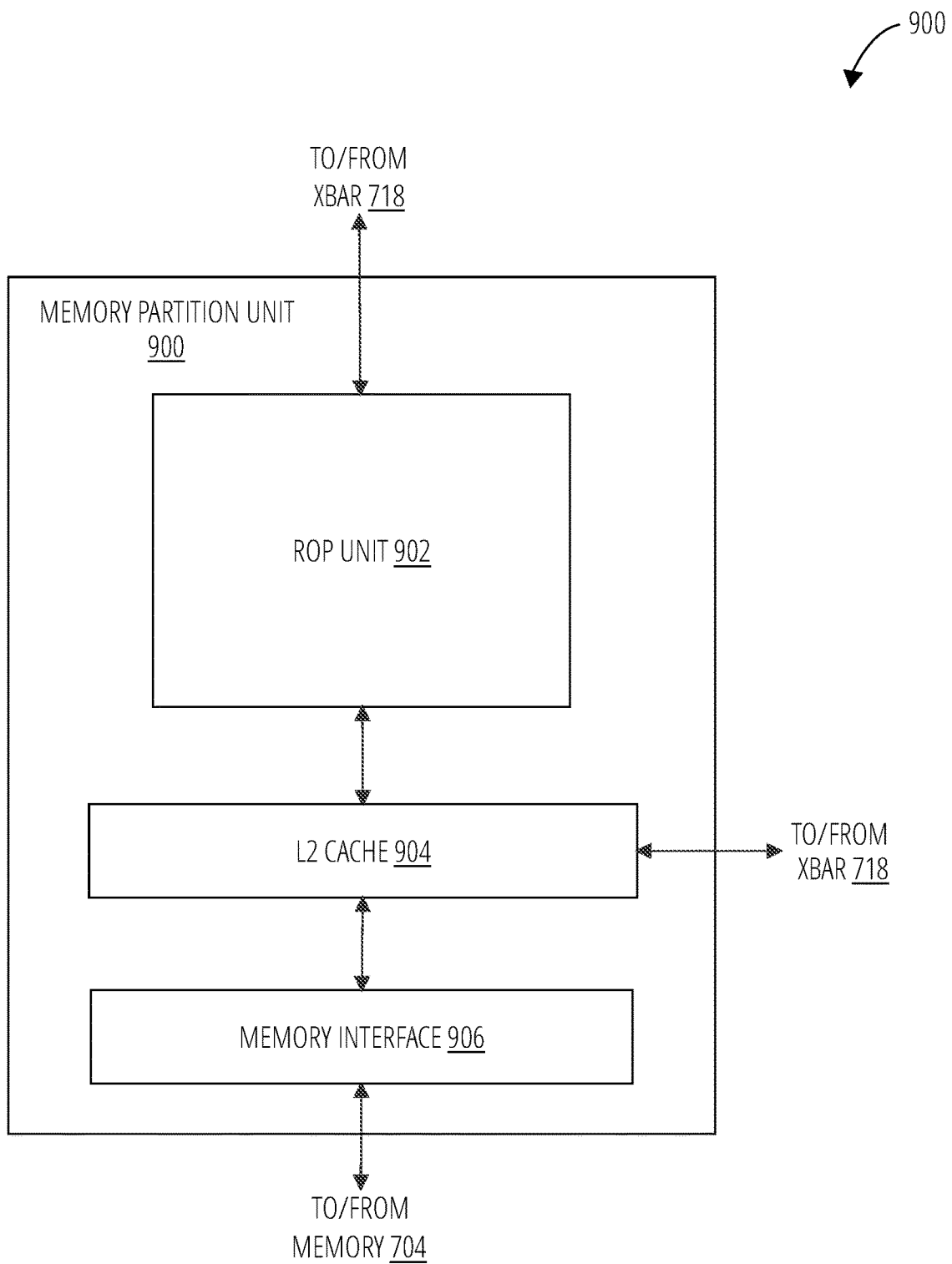
FIG. 9 depicts a memory partition unit 900 in accordance with one embodiment.

The pre-raster operations unit 804 is configured to route data generated by the raster engine 808 and the data processing cluster 806 modules to a Raster Operations (ROP) unit, described in more detail in conjunction with FIG. 9. The pre-raster operations unit 804 may also be configured to perform optimizations for color blending, organize pixel data, perform address translations, and the like.

The raster engine 808 includes a number of fixed function hardware units configured to perform various raster operations. In an embodiment, the raster engine 808 includes a setup engine, a coarse raster engine, a culling engine, a clipping engine, a fine raster engine, and a tile coalescing engine. The setup engine receives transformed vertices and generates plane equations associated with the geometric primitive defined by the vertices. The plane equations are transmitted to the coarse raster engine to generate coverage information (e.g., an x, y coverage mask for a tile) for the primitive. The output of the coarse raster engine is transmitted to the culling engine where fragments associated with the primitive that fail a z-test are culled, and transmitted to a clipping engine where fragments lying outside a viewing frustum are clipped. Those fragments that survive clipping and culling may be passed to the fine raster engine to generate attributes for the pixel fragments based on the plane equations generated by the setup engine. The output of the raster engine 808 comprises fragments to be processed, for example, by a fragment shader implemented within a data processing cluster 806.

Each data processing cluster 806 included in the general processing cluster 800 includes an M-pipe controller 810, a primitive engine 812, and one or more streaming multiprocessor 1000 modules. The M-pipe controller 810 controls the operation of the data processing cluster 806, routing packets received from the pipeline manager 802 to the appropriate units in the data processing cluster 806. For example, packets associated with a vertex may be routed to the primitive engine 812, which is configured to fetch vertex attributes associated with the vertex from the memory 704. In contrast, packets associated with a shader program may be transmitted to the streaming multiprocessor 1000.

The streaming multiprocessor 1000 comprises a programmable streaming processor that is configured to process tasks represented by a number of threads. Each streaming multiprocessor 1000 is multi-threaded and configured to execute a plurality of threads (e.g., 32 threads) from a particular group of threads concurrently. In an embodiment, the streaming multiprocessor 1000 implements a Single-Instruction, Multiple-Data (SIMD) architecture where each thread in a group of threads (e.g., a warp) is configured to process a different set of data based on the same set of instructions. All threads in the group of threads execute the same instructions. In another embodiment, the streaming multiprocessor 1000 implements a Single-Instruction, Multiple Thread (SIMT) architecture where each thread in a group of threads is configured to process a different set of data based on the same set of instructions, but where individual threads in the group of threads are allowed to diverge during execution. In an embodiment, a program counter, call stack, and execution state is maintained for each warp, enabling concurrency between warps and serial execution within warps when threads within the warp diverge. In another embodiment, a program counter, call stack, and execution state is maintained for each individual thread, enabling equal concurrency between all threads, within and between warps. When execution state is maintained for each individual thread, threads executing the same instructions may be converged and executed in parallel for maximum efficiency. The streaming multiprocessor 1000 will be described in more detail below in conjunction with FIG. 10.

The memory management unit 816 provides an interface between the general processing cluster 800 and the memory partition unit 900. The memory management unit 816 may provide translation of virtual addresses into physical addresses, memory protection, and arbitration of memory requests. In an embodiment, the memory management unit 816 provides one or more translation lookaside buffers (TLBs) for performing translation of virtual addresses into physical addresses in the memory 704.

FIG. 9 depicts a memory partition unit 900 of the parallel processing unit 700 of FIG. 7, in accordance with an embodiment. As shown in FIG. 9, the memory partition unit 900 includes a raster operations unit 902, a level two cache 904, and a memory interface 906. The memory interface 906 is coupled to the memory 704. Memory interface 906 may implement 32, 64, 128, 1024-bit data buses, or the like, for high-speed data transfer. In an embodiment, the parallel processing unit 700 incorporates U memory interface 906 modules, one memory interface 906 per pair of memory partition unit 900 modules, where each pair of memory partition unit 900 modules is connected to a corresponding memory 704 device. For example, parallel processing unit 700 may be connected to up to Y memory 704 devices, such as high bandwidth memory stacks or graphics double-data-rate, version 5, synchronous dynamic random access memory, or other types of persistent storage.

In an embodiment, the memory interface 906 implements an HBM2 memory interface and Y equals half U. In an embodiment, the HBM2 memory stacks are located on the same physical package as the parallel processing unit 700, providing substantial power and area savings compared with conventional GDDR5 SDRAM systems. In an embodiment, each HBM2 stack includes four memory dies and Y equals 4, with HBM2 stack including two 128-bit channels per die for a total of 8 channels and a data bus width of 1024 bits.

In an embodiment, the memory 704 supports Single-Error Correcting Double-Error Detecting (SECDED) Error Correction Code (ECC) to protect data. ECC provides higher reliability for compute applications that are sensitive to data corruption. Reliability is especially important in large-scale cluster computing environments where parallel processing unit 700 modules process very large datasets and/or run applications for extended periods.

In an embodiment, the parallel processing unit 700 implements a multi-level memory hierarchy. In an embodiment, the memory partition unit 900 supports a unified memory to provide a single unified virtual address space for CPU and parallel processing unit 700 memory, enabling data sharing between virtual memory systems. In an embodiment the frequency of accesses by a parallel processing unit 700 to memory located on other processors is traced to ensure that memory pages are moved to the physical memory of the parallel processing unit 700 that is accessing the pages more frequently. In an embodiment, the NVLink 708 supports address translation services allowing the parallel processing unit 700 to directly access a CPU's page tables and providing full access to CPU memory by the parallel processing unit 700.

In an embodiment, copy engines transfer data between multiple parallel processing unit 700 modules or between parallel processing unit 700 modules and CPUs. The copy engines can generate page faults for addresses that are not mapped into the page tables. The memory partition unit 900 can then service the page faults, mapping the addresses into the page table, after which the copy engine can perform the transfer. In a conventional system, memory is pinned (e.g., non-pageable) for multiple copy engine operations between multiple processors, substantially reducing the available memory. With hardware page faulting, addresses can be passed to the copy engines without worrying if the memory pages are resident, and the copy process is transparent.

Data from the memory 704 or other system memory may be fetched by the memory partition unit 900 and stored in the level two cache 904, which is located on-chip and is shared between the various general processing cluster 800 modules. As shown, each memory partition unit 900 includes a portion of the level two cache 904 associated with a corresponding memory 704 device. Lower level caches may then be implemented in various units within the general processing cluster 800 modules. For example, each of the streaming multiprocessor 1000 modules may implement an L1 cache. The L1 cache is private memory that is dedicated to a particular streaming multiprocessor 1000. Data from the level two cache 904 may be fetched and stored in each of the L1 caches for processing in the functional units of the streaming multiprocessor 1000 modules. The level two cache 904 is coupled to the memory interface 906 and the crossbar 718.

The raster operations unit 902 performs graphics raster operations related to pixel color, such as color compression, pixel blending, and the like. The raster operations unit 902 also implements depth testing in conjunction with the raster engine 808, receiving a depth for a sample location associated with a pixel fragment from the culling engine of the raster engine 808. The depth is tested against a corresponding depth in a depth buffer for a sample location associated with the fragment. If the fragment passes the depth test for the sample location, then the raster operations unit 902 updates the depth buffer and transmits a result of the depth test to the raster engine 808. It will be appreciated that the number of partition memory partition unit 900 modules may be different than the number of general processing cluster 800 modules and, therefore, each raster operations unit 902 may be coupled to each of the general processing cluster 800 modules. The raster operations unit 902 tracks packets received from the different general processing cluster 800 modules and determines which general processing cluster 800 that a result generated by the raster operations unit 902 is routed to through the crossbar 718. Although the raster operations unit 902 is included within the memory partition unit 900 in FIG. 9, in other embodiment, the raster operations unit 902 may be outside of the memory partition unit 900. For example, the raster operations unit 902 may reside in the general processing cluster 800 or another unit.

Figure 10:
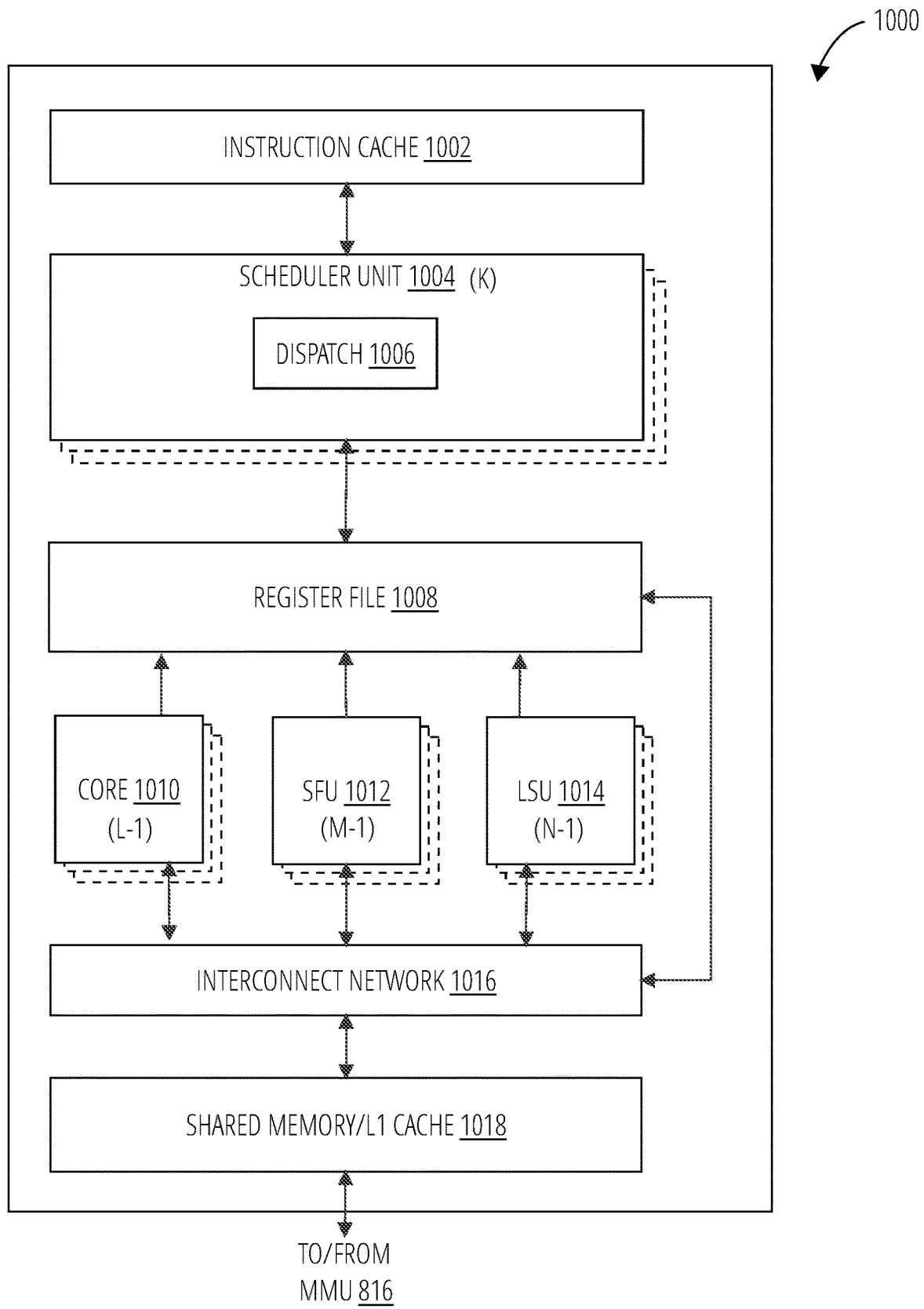
FIG. 10 depicts a streaming multiprocessor 1000 in accordance with one embodiment.

FIG. 10 illustrates the streaming multiprocessor 1000 of FIG. 8, in accordance with an embodiment. As shown in FIG. 10, the streaming multiprocessor 1000 includes an instruction cache 1002, one or more scheduler unit 1004 modules (e.g., such as scheduler unit 712), a register file 1008, one or more processing core 1010 modules, one or more special function unit 1012 modules, one or more load/store unit 1014 modules, an interconnect network 1016, and a shared memory/L1 cache 1018.

As described above, the work distribution unit 714 dispatches tasks for execution on the general processing cluster 800 modules of the parallel processing unit 700. The tasks are allocated to a particular data processing cluster 806 within a general processing cluster 800 and, if the task is associated with a shader program, the task may be allocated to a streaming multiprocessor 1000. The scheduler unit 712 receives the tasks from the work distribution unit 714 and manages instruction scheduling for one or more thread blocks assigned to the streaming multiprocessor 1000. The scheduler unit 1004 schedules thread blocks for execution as warps of parallel threads, where each thread block is allocated at least one warp. In an embodiment, each warp executes 32 threads. The scheduler unit 1004 may manage a plurality of different thread blocks, allocating the warps to the different thread blocks and then dispatching instructions from the plurality of different cooperative groups to the various functional units (e.g., core 1010 modules, special function unit 1012 modules, and load/store unit 1014 modules) during each clock cycle.

Cooperative Groups is a programming model for organizing groups of communicating threads that allows developers to express the granularity at which threads are communicating, enabling the expression of richer, more efficient parallel decompositions. Cooperative launch APIs support synchronization amongst thread blocks for the execution of parallel algorithms. Conventional programming models provide a single, simple construct for synchronizing cooperating threads: a barrier across all threads of a thread block (e.g., the syncthreads( ) function). However, programmers would often like to define groups of threads at smaller than thread block granularities and synchronize within the defined groups to enable greater performance, design flexibility, and software reuse in the form of collective group-wide function interfaces.

Cooperative Groups enables programmers to define groups of threads explicitly at sub-block (e.g., as small as a single thread) and multi-block granularities, and to perform collective operations such as synchronization on the threads in a cooperative group. The programming model supports clean composition across software boundaries, so that libraries and utility functions can synchronize safely within their local context without having to make assumptions about convergence. Cooperative Groups primitives enable new patterns of cooperative parallelism, including producer-consumer parallelism, opportunistic parallelism, and global synchronization across an entire grid of thread blocks.

A dispatch 1006 unit is configured within the scheduler unit 1004 to transmit instructions to one or more of the functional units. In one embodiment, the scheduler unit 1004 includes two dispatch 1006 units that enable two different instructions from the same warp to be dispatched during each clock cycle. In alternative embodiments, each scheduler unit 1004 may include a single dispatch 1006 unit or additional dispatch 1006 units.

Each streaming multiprocessor 1000 includes a register file 1008 that provides a set of registers for the functional units of the streaming multiprocessor 1000. In an embodiment, the register file 1008 is divided between each of the functional units such that each functional unit is allocated a dedicated portion of the register file 1008. In another embodiment, the register file 1008 is divided between the different warps being executed by the streaming multiprocessor 1000. The register file 1008 provides temporary storage for operands connected to the data paths of the functional units.

Each streaming multiprocessor 1000 comprises L processing core 1010 modules. In an embodiment, the streaming multiprocessor 1000 includes a large number (e.g., 128, etc.) of distinct processing core 1010 modules. Each core 1010 may include a fully-pipelined, single-precision, double-precision, and/or mixed precision processing unit that includes a floating point arithmetic logic unit and an integer arithmetic logic unit. In an embodiment, the floating point arithmetic logic units implement the IEEE 754-2008 standard for floating point arithmetic. In an embodiment, the core 1010 modules include 64 single-precision (32-bit) floating point cores, 64 integer cores, 32 double-precision (64-bit) floating point cores, and 8 tensor cores.

Tensor cores configured to perform matrix operations, and, in an embodiment, one or more tensor cores are included in the core 1010 modules. In particular, the tensor cores are configured to perform deep learning matrix arithmetic, such as convolution operations for neural network training and inferencing. In an embodiment, each tensor core operates on a 4×4 matrix and performs a matrix multiply and accumulate operation D=A'B+C, where A, B, C, and D are 4×4 matrices.

In an embodiment, the matrix multiply inputs A and B are 16-bit floating point matrices, while the accumulation matrices C and D may be 16-bit floating point or 32-bit floating point matrices. Tensor Cores operate on 16-bit floating point input data with 32-bit floating point accumulation. The 16-bit floating point multiply requires 64 operations and results in a full precision product that is then accumulated using 32-bit floating point addition with the other intermediate products for a 4×4×4 matrix multiply. In practice, Tensor Cores are used to perform much larger two-dimensional or higher dimensional matrix operations, built up from these smaller elements. An API, such as CUDA 9 C++ API, exposes specialized matrix load, matrix multiply and accumulate, and matrix store operations to efficiently use Tensor Cores from a CUDA-C++ program. At the CUDA level, the warp-level interface assumes 16×16 size matrices spanning all 32 threads of the warp.

Each streaming multiprocessor 1000 also comprises M special function unit 1012 modules that perform special functions (e.g., attribute evaluation, reciprocal square root, and the like). In an embodiment, the special function unit 1012 modules may include a tree traversal unit configured to traverse a hierarchical tree data structure. In an embodiment, the special function unit 1012 modules may include texture unit configured to perform texture map filtering operations. In an embodiment, the texture units are configured to load texture maps (e.g., a 2D array of texels) from the memory 704 and sample the texture maps to produce sampled texture values for use in shader programs executed by the streaming multiprocessor 1000. In an embodiment, the texture maps are stored in the shared memory/L1 cache 1018. The texture units implement texture operations such as filtering operations using mip-maps (e.g., texture maps of varying levels of detail). In an embodiment, each streaming multiprocessor 1000 includes two texture units.

Each streaming multiprocessor 1000 also comprises N load/store unit 1014 modules that implement load and store operations between the shared memory/L1 cache 1018 and the register file 1008. Each streaming multiprocessor 1000 includes an interconnect network 1016 that connects each of the functional units to the register file 1008 and the load/store unit 1014 to the register file 1008 and shared memory/L1 cache 1018. In an embodiment, the interconnect network 1016 is a crossbar that can be configured to connect any of the functional units to any of the registers in the register file 1008 and connect the load/store unit 1014 modules to the register file 1008 and memory locations in shared memory/L1 cache 1018.

The shared memory/L1 cache 1018 is an array of on-chip memory that allows for data storage and communication between the streaming multiprocessor 1000 and the primitive engine 812 and between threads in the streaming multiprocessor 1000. In an embodiment, the shared memory/L1 cache 1018 comprises 128 KB of storage capacity and is in the path from the streaming multiprocessor 1000 to the memory partition unit 900. The shared memory/L1 cache 1018 can be used to cache reads and writes. One or more of the shared memory/L1 cache 1018, level two cache 904, and memory 704 are backing stores.

Combining data cache and shared memory functionality into a single memory block provides the best overall performance for both types of memory accesses. The capacity is usable as a cache by programs that do not use shared memory. For example, if shared memory is configured to use half of the capacity, texture and load/store operations can use the remaining capacity. Integration within the shared memory/L1 cache 1018 enables the shared memory/L1 cache 1018 to function as a high-throughput conduit for streaming data while simultaneously providing high-bandwidth and low-latency access to frequently reused data.

When configured for general purpose parallel computation, a simpler configuration can be used compared with graphics processing. Specifically, the fixed function graphics processing units shown in FIG. 7, are bypassed, creating a much simpler programming model. In the general purpose parallel computation configuration, the work distribution unit 714 assigns and distributes blocks of threads directly to the data processing cluster 806 modules. The threads in a block execute the same program, using a unique thread ID in the calculation to ensure each thread generates unique results, using the streaming multiprocessor 1000 to execute the program and perform calculations, shared memory/L1 cache 1018 to communicate between threads, and the load/store unit 1014 to read and write global memory through the shared memory/L1 cache 1018 and the memory partition unit 900. When configured for general purpose parallel computation, the streaming multiprocessor 1000 can also write commands that the scheduler unit 712 can use to launch new work on the data processing cluster 806 modules.

The parallel processing unit 700 may be included in a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, and the like. In an embodiment, the parallel processing unit 700 is embodied on a single semiconductor substrate. In another embodiment, the parallel processing unit 700 is included in a system-on-a-chip (SoC) along with one or more other devices such as additional parallel processing unit 700 modules, the memory 704, a reduced instruction set computer (RISC) CPU, a memory management unit (MMU), a digital-to-analog converter (DAC), and the like.

In an embodiment, the parallel processing unit 700 may be included on a graphics card that includes one or more memory devices. The graphics card may be configured to interface with a PCIe slot on a motherboard of a desktop computer. In yet another embodiment, the parallel processing unit 700 may be an integrated graphics processing unit (iGPU) or parallel processor included in the chipset of the motherboard.

Exemplary Computing System

Systems with multiple GPUs and CPUs are used in a variety of industries as developers expose and leverage more parallelism in applications such as artificial intelligence computing. High-performance GPU-accelerated systems with tens to many thousands of compute nodes are deployed in data centers, research facilities, and supercomputers to solve ever larger problems. As the number of processing devices within the high-performance systems increases, the communication and data transfer mechanisms need to scale to support the increased bandwidth.

Figure 11:
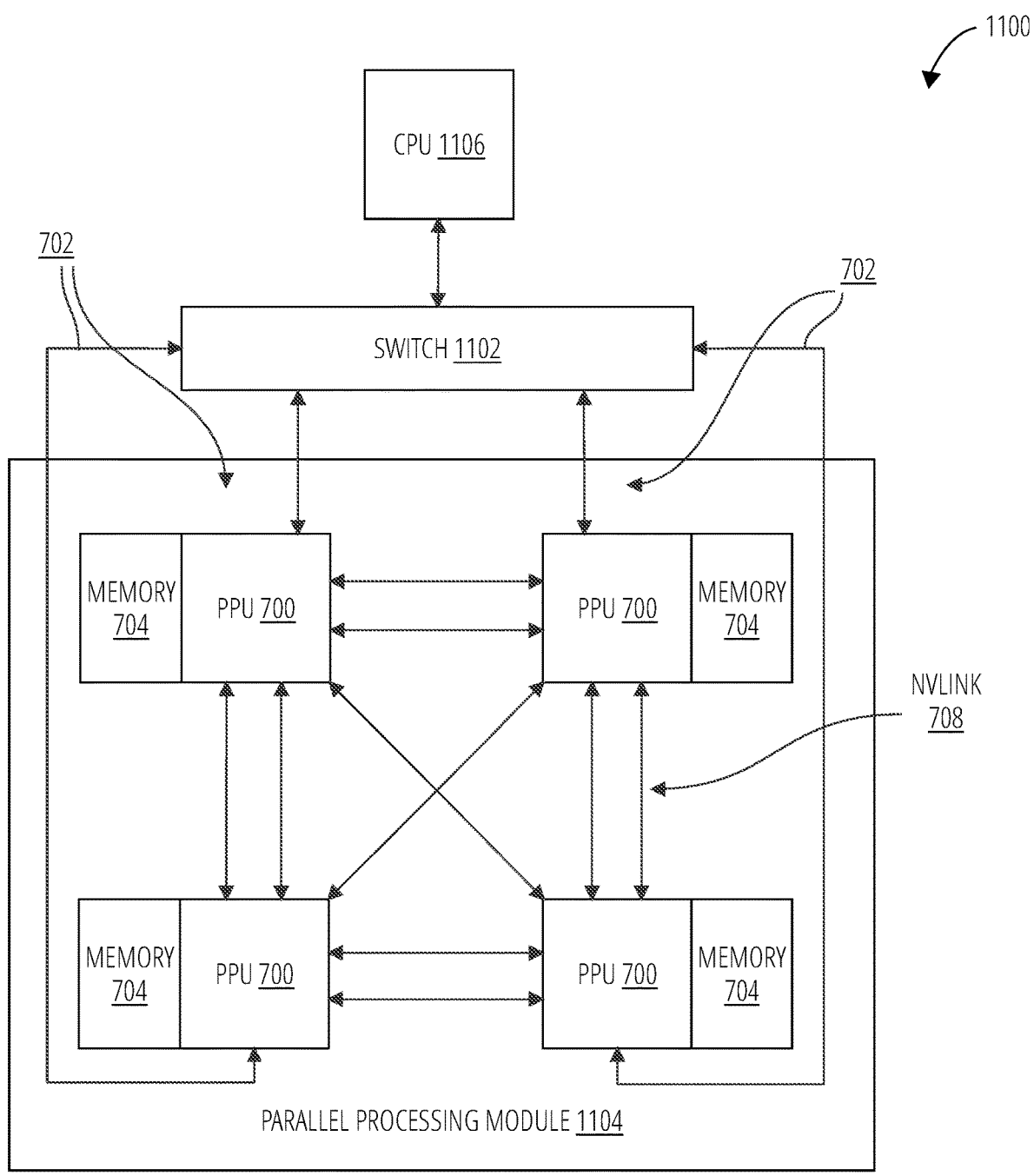
FIG. 11 depicts a processing system 1100 in accordance with one embodiment.

FIG. 11 is a conceptual diagram of a processing system 1100 implemented using the parallel processing unit 700 of FIG. 7, in accordance with an embodiment. The processing system 1100 includes a central processing unit 1106, switch 1102, and multiple parallel processing unit 700 modules each and respective memory 704 modules. The NVLink 708 provides high-speed communication links between each of the parallel processing unit 700 modules. Although a particular number of NVLink 708 and interconnect 702 connections are illustrated in FIG. 11, the number of connections to each parallel processing unit 700 and the central processing unit 1106 may vary. The switch 1102 interfaces between the interconnect 702 and the central processing unit 1106. The parallel processing unit 700 modules, memory 704 modules, and NVLink 708 connections may be situated on a single semiconductor platform to form a parallel processing module 1104. In an embodiment, the switch 1102 supports two or more protocols to interface between various different connections and/or links.

In another embodiment (not shown), the NVLink 708 provides one or more high-speed communication links between each of the parallel processing unit 700 modules and the central processing unit 1106 and the switch 1102 interfaces between the interconnect 702 and each of the parallel processing unit 700 modules. The parallel processing unit 700 modules, memory 704 modules, and interconnect 702 may be situated on a single semiconductor platform to form a parallel processing module 1104. In yet another embodiment (not shown), the interconnect 702 provides one or more communication links between each of the parallel processing unit 700 modules and the central processing unit 1106 and the switch 1102 interfaces between each of the parallel processing unit 700 modules using the NVLink 708 to provide one or more high-speed communication links between the parallel processing unit 700 modules. In another embodiment (not shown), the NVLink 708 provides one or more high-speed communication links between the parallel processing unit 700 modules and the central processing unit 1106 through the switch 1102. In yet another embodiment (not shown), the interconnect 702 provides one or more communication links between each of the parallel processing unit 700 modules directly. One or more of the NVLink 708 high-speed communication links may be implemented as a physical NVLink interconnect or either an on-chip or on-die interconnect using the same protocol as the NVLink 708.

In the context of the present description, a single semiconductor platform may refer to a sole unitary semiconductor-based integrated circuit fabricated on a die or chip. It should be noted that the term single semiconductor platform may also refer to multi-chip modules with increased connectivity which simulate on-chip operation and make substantial improvements over utilizing a conventional bus implementation. Of course, the various circuits or devices may also be situated separately or in various combinations of semiconductor platforms per the desires of the user. Alternately, the parallel processing module 1104 may be implemented as a circuit board substrate and each of the parallel processing unit 700 modules and/or memory 704 modules may be packaged devices. In an embodiment, the central processing unit 1106, switch 1102, and the parallel processing module 1104 are situated on a single semiconductor platform.

In an embodiment, the signaling rate of each NVLink 708 is 20 to 25 Gigabits/second and each parallel processing unit 700 includes six NVLink 708 interfaces (as shown in FIG. 11, five NVLink 708 interfaces are included for each parallel processing unit 700). Each NVLink 708 provides a data transfer rate of 25 Gigabytes/second in each direction, with six links providing 300 Gigabytes/second. The NVLink 708 can be used exclusively for PPU-to-PPU communication as shown in FIG. 11, or some combination of PPU-to-PPU and PPU-to-CPU, when the central processing unit 1106 also includes one or more NVLink 708 interfaces.

In an embodiment, the NVLink 708 allows direct load/store/atomic access from the central processing unit 1106 to each parallel processing unit 700 module's memory 704. In an embodiment, the NVLink 708 supports coherency operations, allowing data read from the memory 704 modules to be stored in the cache hierarchy of the central processing unit 1106, reducing cache access latency for the central processing unit 1106. In an embodiment, the NVLink 708 includes support for Address Translation Services (ATS), allowing the parallel processing unit 700 to directly access page tables within the central processing unit 1106. One or more of the NVLink 708 may also be configured to operate in a low-power mode.

Figure 12:
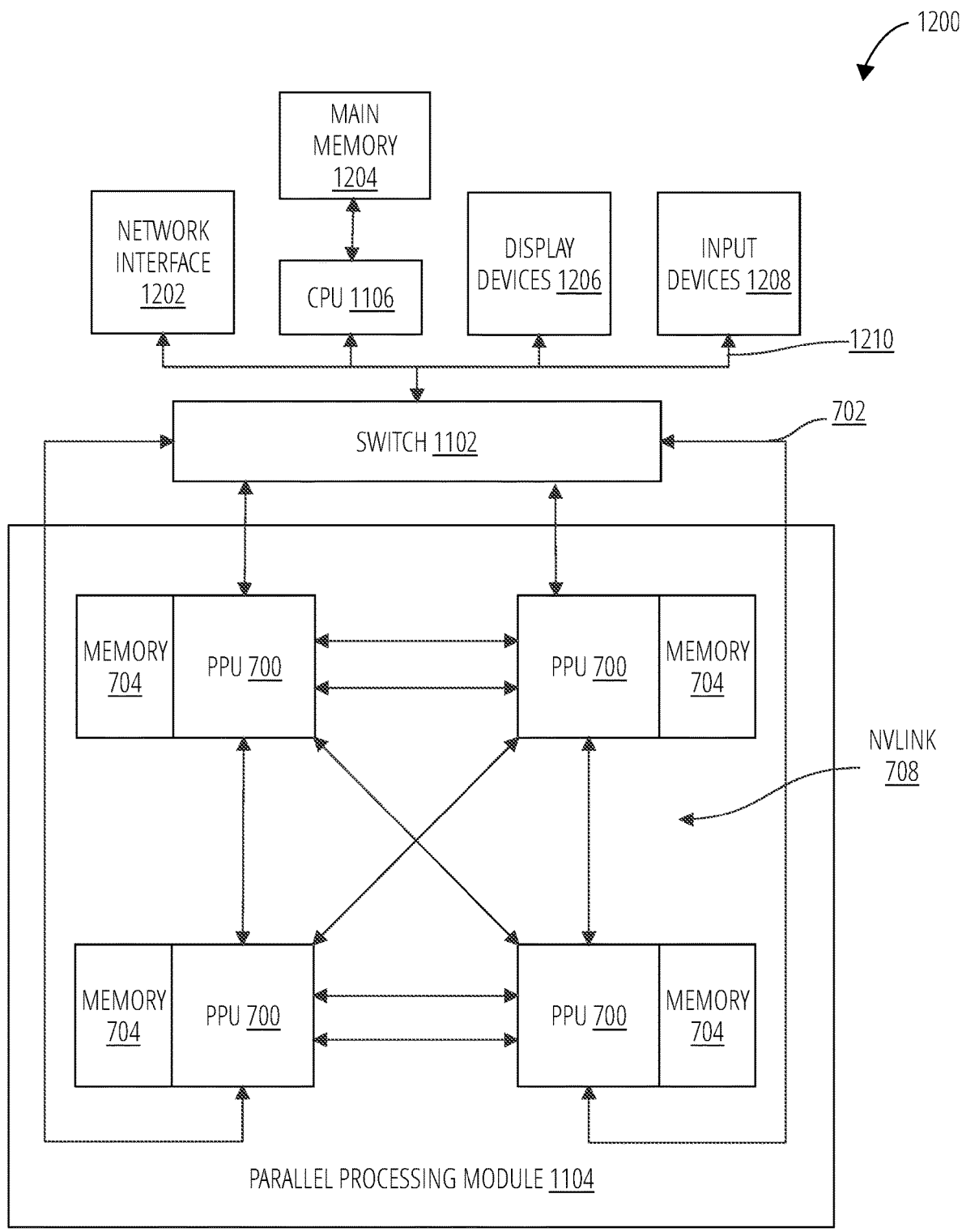
FIG. 12 depicts an exemplary processing system 1200 in accordance with another embodiment.

FIG. 12 depicts an exemplary processing system 1200 in which the various architecture and/or functionality of the various previous embodiments may be implemented. As shown, an exemplary processing system 1200 is provided including at least one central processing unit 1106 that is connected to a communications bus 1210. The communication communications bus 1210 may be implemented using any suitable protocol, such as PCI (Peripheral Component Interconnect), PCI-Express, AGP (Accelerated Graphics Port), HyperTransport, or any other bus or point-to-point communication protocol(s). The exemplary processing system 1200 also includes a main memory 1204. Control logic (software) and data are stored in the main memory 1204 which may take the form of random access memory (RAM).

The exemplary processing system 1200 also includes input devices 1208, the parallel processing module 1104, and display devices 1206, e.g. a conventional CRT (cathode ray tube), LCD (liquid crystal display), LED (light emitting diode), plasma display or the like. User input may be received from the input devices 1208, e.g., keyboard, mouse, touchpad, microphone, and the like. Each of the foregoing modules and/or devices may even be situated on a single semiconductor platform to form the exemplary processing system 1200. Alternately, the various modules may also be situated separately or in various combinations of semiconductor platforms per the desires of the user.

Further, the exemplary processing system 1200 may be coupled to a network (e.g., a telecommunications network, local area network (LAN), wireless network, wide area network (WAN) such as the Internet, peer-to-peer network, cable network, or the like) through a network interface 1202 for communication purposes.

The exemplary processing system 1200 may also include a secondary storage (not shown). The secondary storage includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner.

Computer programs, or computer control logic algorithms, may be stored in the main memory 1204 and/or the secondary storage. Such computer programs, when executed, enable the exemplary processing system 1200 to perform various functions. The main memory 1204, the storage, and/or any other storage are possible examples of computer-readable media.

The architecture and/or functionality of the various previous figures may be implemented in the context of a general computer system, a circuit board system, a game console system dedicated for entertainment purposes, an application-specific system, and/or any other desired system. For example, the exemplary processing system 1200 may take the form of a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, a mobile phone device, a television, workstation, game consoles, embedded system, and/or any other type of logic.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

Graphics Processing Pipeline

FIG. 12 is a conceptual diagram of a graphics processing pipeline 1300 implemented by the parallel processing unit 700 of FIG. 7, in accordance with an embodiment. In an embodiment, the parallel processing unit 700 comprises a graphics processing unit (GPU). The parallel processing unit 700 is configured to receive commands that specify shader programs for processing graphics data. Graphics data may be defined as a set of primitives such as points, lines, triangles, quads, triangle strips, and the like. Typically, a primitive includes data that specifies a number of vertices for the primitive (e.g., in a model-space coordinate system) as well as attributes associated with each vertex of the primitive. The parallel processing unit 700 can be configured to process the graphics primitives to generate a frame buffer (e.g., pixel data for each of the pixels of the display).

An application writes model data for a scene (e.g., a collection of vertices and attributes) to a memory such as a system memory or memory 704. The model data defines each of the objects that may be visible on a display. The application then makes an API call to the driver kernel that requests the model data to be rendered and displayed. The driver kernel reads the model data and writes commands to the one or more streams to perform operations to process the model data. The commands may reference different shader programs to be implemented on the streaming multiprocessor 1000 modules of the parallel processing unit 700 including one or more of a vertex shader, hull shader, domain shader, geometry shader, and a pixel shader. For example, one or more of the streaming multiprocessor 1000 modules may be configured to execute a vertex shader program that processes a number of vertices defined by the model data. In an embodiment, the different streaming multiprocessor 1000 modules may be configured to execute different shader programs concurrently. For example, a first subset of streaming multiprocessor 1000 modules may be configured to execute a vertex shader program while a second subset of streaming multiprocessor 1000 modules may be configured to execute a pixel shader program. The first subset of streaming multiprocessor 1000 modules processes vertex data to produce processed vertex data and writes the processed vertex data to the level two cache 904 and/or the memory 704. After the processed vertex data is rasterized (e.g., transformed from three-dimensional data into two-dimensional data in screen space) to produce fragment data, the second subset of streaming multiprocessor 1000 modules executes a pixel shader to produce processed fragment data, which is then blended with other processed fragment data and written to the frame buffer in memory 704. The vertex shader program and pixel shader program may execute concurrently, processing different data from the same scene in a pipelined fashion until all of the model data for the scene has been rendered to the frame buffer. Then, the contents of the frame buffer are transmitted to a display controller for display on a display device.

The graphics processing pipeline 1300 is an abstract flow diagram of the processing steps implemented to generate 2D computer-generated images from 3D geometry data. As is well-known, pipeline architectures may perform long latency operations more efficiently by splitting up the operation into a plurality of stages, where the output of each stage is coupled to the input of the next successive stage. Thus, the graphics processing pipeline 1300 receives input data 601 that is transmitted from one stage to the next stage of the graphics processing pipeline 1300 to generate output data 1304. In an embodiment, the graphics processing pipeline 1300 may represent a graphics processing pipeline defined by the OpenGL® API. As an option, the graphics processing pipeline 1300 may be implemented in the context of the functionality and architecture of the previous Figures and/or any subsequent Figure(s).

Figure 13:
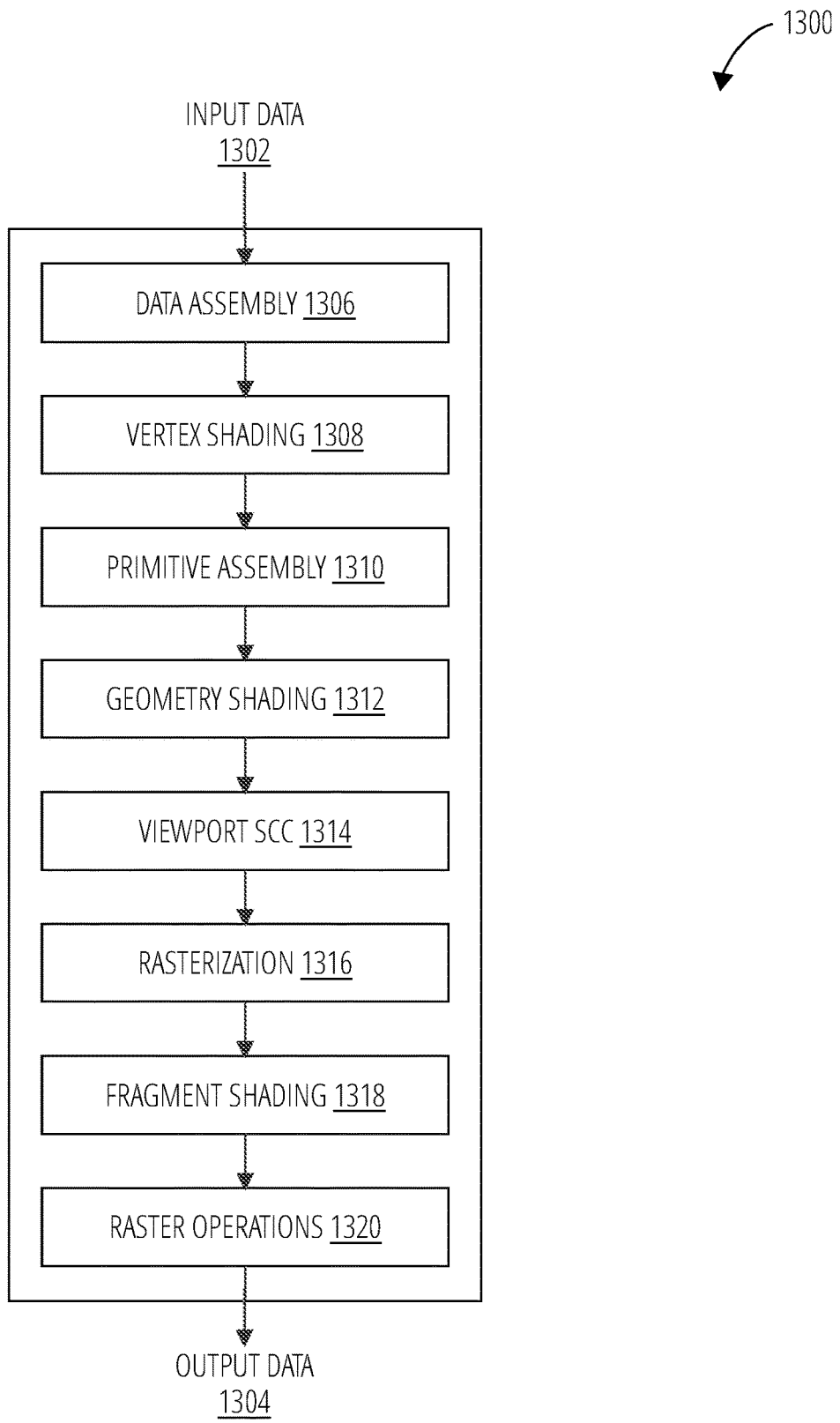
FIG. 13 depicts a graphics processing pipeline 1300 in accordance with one embodiment.

As shown in FIG. 13, the graphics processing pipeline 1300 comprises a pipeline architecture that includes a number of stages. The stages include, but are not limited to, a data assembly 1306 stage, a vertex shading 1308 stage, a primitive assembly 1310 stage, a geometry shading 1312 stage, a viewport SCC 1314 stage, a rasterization 1316 stage, a fragment shading 1318 stage, and a raster operations 1320 stage. In an embodiment, the input data 1302 comprises commands that configure the processing units to implement the stages of the graphics processing pipeline 1300 and geometric primitives (e.g., points, lines, triangles, quads, triangle strips or fans, etc.) to be processed by the stages. The output data 1304 may comprise pixel data (e.g., color data) that is copied into a frame buffer or other type of surface data structure in a memory.

The data assembly 1306 stage receives the input data 1302 that specifies vertex data for high-order surfaces, primitives, or the like. The data assembly 1306 stage collects the vertex data in a temporary storage or queue, such as by receiving a command from the host processor that includes a pointer to a buffer in memory and reading the vertex data from the buffer. The vertex data is then transmitted to the vertex shading 1308 stage for processing.

The vertex shading 1308 stage processes vertex data by performing a set of operations (e.g., a vertex shader or a program) once for each of the vertices. Vertices may be, e.g., specified as a 4-coordinate vector (e.g., <x, y, z, w>) associated with one or more vertex attributes (e.g., color, texture coordinates, surface normal, etc.). The vertex shading 1308 stage may manipulate individual vertex attributes such as position, color, texture coordinates, and the like. In other words, the vertex shading 1308 stage performs operations on the vertex coordinates or other vertex attributes associated with a vertex. Such operations commonly including lighting operations (e.g., modifying color attributes for a vertex) and transformation operations (e.g., modifying the coordinate space for a vertex). For example, vertices may be specified using coordinates in an object-coordinate space, which are transformed by multiplying the coordinates by a matrix that translates the coordinates from the object-coordinate space into a world space or a normalized-device-coordinate (NCD) space. The vertex shading 1308 stage generates transformed vertex data that is transmitted to the primitive assembly 1310 stage.

The primitive assembly 1310 stage collects vertices output by the vertex shading 1308 stage and groups the vertices into geometric primitives for processing by the geometry shading 1312 stage. For example, the primitive assembly 1310 stage may be configured to group every three consecutive vertices as a geometric primitive (e.g., a triangle) for transmission to the geometry shading 1312 stage. In some embodiments, specific vertices may be reused for consecutive geometric primitives (e.g., two consecutive triangles in a triangle strip may share two vertices). The primitive assembly 1310 stage transmits geometric primitives (e.g., a collection of associated vertices) to the geometry shading 1312 stage.

The geometry shading 1312 stage processes geometric primitives by performing a set of operations (e.g., a geometry shader or program) on the geometric primitives. Tessellation operations may generate one or more geometric primitives from each geometric primitive. In other words, the geometry shading 1312 stage may subdivide each geometric primitive into a finer mesh of two or more geometric primitives for processing by the rest of the graphics processing pipeline 1300. The geometry shading 1312 stage transmits geometric primitives to the viewport SCC 1314 stage.

In an embodiment, the graphics processing pipeline 1300 may operate within a streaming multiprocessor and the vertex shading 1308 stage, the primitive assembly 1310 stage, the geometry shading 1312 stage, the fragment shading 1318 stage, and/or hardware/software associated therewith, may sequentially perform processing operations. Once the sequential processing operations are complete, in an embodiment, the viewport SCC 1314 stage may utilize the data. In an embodiment, primitive data processed by one or more of the stages in the graphics processing pipeline 1300 may be written to a cache (e.g. L1 cache, a vertex cache, etc.). In this case, in an embodiment, the viewport SCC 1314 stage may access the data in the cache. In an embodiment, the viewport SCC 1314 stage and the rasterization 1316 stage are implemented as fixed function circuitry.

The viewport SCC 1314 stage performs viewport scaling, culling, and clipping of the geometric primitives. Each surface being rendered to is associated with an abstract camera position. The camera position represents a location of a viewer looking at the scene and defines a viewing frustum that encloses the objects of the scene. The viewing frustum may include a viewing plane, a rear plane, and four clipping planes. Any geometric primitive entirely outside of the viewing frustum may be culled (e.g., discarded) because the geometric primitive will not contribute to the final rendered scene. Any geometric primitive that is partially inside the viewing frustum and partially outside the viewing frustum may be clipped (e.g., transformed into a new geometric primitive that is enclosed within the viewing frustum. Furthermore, geometric primitives may each be scaled based on a depth of the viewing frustum. All potentially visible geometric primitives are then transmitted to the rasterization 1316 stage.

The rasterization 1316 stage converts the 3D geometric primitives into 2D fragments (e.g. capable of being utilized for display, etc.). The rasterization 1316 stage may be configured to utilize the vertices of the geometric primitives to setup a set of plane equations from which various attributes can be interpolated. The rasterization 1316 stage may also compute a coverage mask for a plurality of pixels that indicates whether one or more sample locations for the pixel intercept the geometric primitive. In an embodiment, z-testing may also be performed to determine if the geometric primitive is occluded by other geometric primitives that have already been rasterized. The rasterization 1316 stage generates fragment data (e.g., interpolated vertex attributes associated with a particular sample location for each covered pixel) that are transmitted to the fragment shading 1318 stage.

The fragment shading 1318 stage processes fragment data by performing a set of operations (e.g., a fragment shader or a program) on each of the fragments. The fragment shading 1318 stage may generate pixel data (e.g., color values) for the fragment such as by performing lighting operations or sampling texture maps using interpolated texture coordinates for the fragment. The fragment shading 1318 stage generates pixel data that is transmitted to the raster operations 1320 stage.

The raster operations 1320 stage may perform various operations on the pixel data such as performing alpha tests, stencil tests, and blending the pixel data with other pixel data corresponding to other fragments associated with the pixel. When the raster operations 1320 stage has finished processing the pixel data (e.g., the output data 1304), the pixel data may be written to a render target such as a frame buffer, a color buffer, or the like.

It will be appreciated that one or more additional stages may be included in the graphics processing pipeline 1300 in addition to or in lieu of one or more of the stages described above. Various implementations of the abstract graphics processing pipeline may implement different stages. Furthermore, one or more of the stages described above may be excluded from the graphics processing pipeline in some embodiments (such as the geometry shading 1312 stage). Other types of graphics processing pipelines are contemplated as being within the scope of the present disclosure. Furthermore, any of the stages of the graphics processing pipeline 1300 may be implemented by one or more dedicated hardware units within a graphics processor such as parallel processing unit 700. Other stages of the graphics processing pipeline 1300 may be implemented by programmable hardware units such as the streaming multiprocessor 1000 of the parallel processing unit 700.

The graphics processing pipeline 1300 may be implemented via an application executed by a host processor, such as a CPU. In an embodiment, a device driver may implement an application programming interface (API) that defines various functions that can be utilized by an application in order to generate graphical data for display. The device driver is a software program that includes a plurality of instructions that control the operation of the parallel processing unit 700. The API provides an abstraction for a programmer that lets a programmer utilize specialized graphics hardware, such as the parallel processing unit 700, to generate the graphical data without requiring the programmer to utilize the specific instruction set for the parallel processing unit 700. The application may include an API call that is routed to the device driver for the parallel processing unit 700. The device driver interprets the API call and performs various operations to respond to the API call. In some instances, the device driver may perform operations by executing instructions on the CPU. In other instances, the device driver may perform operations, at least in part, by launching operations on the parallel processing unit 700 utilizing an input/output interface between the CPU and the parallel processing unit 700. In an embodiment, the device driver is configured to implement the graphics processing pipeline 1300 utilizing the hardware of the parallel processing unit 700.

Various programs may be executed within the parallel processing unit 700 in order to implement the various stages of the graphics processing pipeline 1300. For example, the device driver may launch a kernel on the parallel processing unit 700 to perform the vertex shading 1308 stage on one streaming multiprocessor 1000 (or multiple streaming multiprocessor 1000 modules). The device driver (or the initial kernel executed by the parallel processing unit 700) may also launch other kernels on the parallel processing unit 700 to perform other stages of the graphics processing pipeline 1300, such as the geometry shading 1312 stage and the fragment shading 1318 stage. In addition, some of the stages of the graphics processing pipeline 1300 may be implemented on fixed unit hardware such as a rasterizer or a data assembler implemented within the parallel processing unit 700. It will be appreciated that results from one kernel may be processed by one or more intervening fixed function hardware units before being processed by a subsequent kernel on a streaming multiprocessor 1000.

Various logic functional operations described herein may be implemented in logic that is referred to using a noun or noun phrase reflecting said operation or function. For example, an association operation may be carried out by an "associator" or "correlator". Likewise, switching may be carried out by a "switch", selection by a "selector", and so on.

"Logic" is used herein to machine memory circuits, non transitory machine readable media, and/or circuitry which by way of its material and/or material-energy configuration comprises control and/or procedural signals, and/or settings and values (such as resistance, impedance, capacitance, inductance, current/voltage ratings, etc.), that may be applied to influence the operation of a device. Magnetic media, electronic circuits, electrical and optical memory (both volatile and nonvolatile), and firmware are examples of logic. Logic specifically excludes pure signals or software per se (however does not exclude machine memories comprising software and thereby forming configurations of matter).

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "credit distribution circuit configured to distribute credits to a plurality of processor cores" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function after programming.

Reciting in the appended claims that a structure is "configured to" perform one or more tasks is expressly intended not to invoke 35 U.S.C. § 112(f) for that claim element. Accordingly, claims in this application that do not otherwise include the "means for" [performing a function] construct should not be interpreted under 35 U.S.C § 112(f).

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

As used herein, the terms "first," "second," etc. are used as labels for nouns that they precede, and do not imply any type of ordering (e.g., spatial, temporal, logical, etc.), unless stated otherwise. For example, in a register file having eight registers, the terms "first register" and "second register" can be used to refer to any two of the eight registers, and not, for example, just logical registers 0 and 1.

When used in the claims, the term "or" is used as an inclusive or and not as an exclusive or. For example, the phrase "at least one of x, y, or z" means any one of x, y, and z, as well as any combination thereof.

What is claimed is:

1. A method comprising:
   partitioning a circuit structure into a grid comprising grid tiles;
   for a plurality of logic cells of the circuit structure, for a plurality of sub-intervals of a clock period, amortizing a power consumption of a plurality of logic cells of the circuit structure into a set of grid tiles that span multiple logic cells, thus forming a set of power maps; and
   applying the power maps to a neural network to generate one or more current resistance (IR) drop prediction for the logic cells of the circuit structure.

2. The method of claim 1, wherein the neural network is a convolutional neural network.

3. The method of claim 1, wherein amortizing the power consumption of the cell comprises dividing the power consumption of the cell evenly into each tile of the set of grid tiles that comprises a portion of the cell.

4. The method of claim 1, wherein the IR drop prediction of the neural network comprises a single maximal output of the neural network.

5. The method of claim 1, wherein the grid tiles have uniform dimensions.

6. The method of claim 1, wherein the power consumption for a cell comprises cell internal power, cell switching power, cell leakage power, and cell toggle rate.

7. The method of claim 1, wherein the power consumption for a cell comprises path resistance.

8. The method of claim 6, wherein the cell internal power, the cell switching power, and the cell leakage power are scaled by a toggle rate.

9. A system comprising:
   a power map generator for a circuit structure comprising a plurality of logic cells, the power map generator configured to generate a plurality of power maps over a period of a clock signal driving the logic cells;
   a neural network coupled to receive the set of power maps from the power map generator and configured to transform the set of power maps into IR drop predictions at power pins of the logic cells of the circuit structure in the clock period; and
   wherein the power map generator is configured to partition the circuit structure into a grid comprising grid tiles for sub-intervals of the clock period, and to amortize a power consumption of the logic cells into one or more of the grid tiles that comprise at least a portion the logic cells, thus forming the set of power maps.

10. The system of claim 9, wherein the power map generator is further configured to append to the power maps sub-interval-independent values for scaled power, scaled internal power, and scaled switching power.

11. The system of claim 9 wherein the neural network comprises at least four convolutional layers.

12. The system of claim 9 wherein the neural network comprises at least two fully connected layers.

13. The system of claim 9 wherein the neural network comprises at least two Maxpooling layers.

14. The system of claim 9 wherein the neural network is configured to utilize batch normalization.

15. The system of claim 9 wherein the neural network is configured to apply backpropagation.

16. A non-transitory computer-readable storage medium, the computer-readable storage medium including instructions that when executed by a computer, cause the computer to:
   partition a circuit structure comprising a plurality of logic cells into a grid comprising grid tiles, wherein at least some of the grid tiles comprise portions of multiple ones of the logic cells;
   for a plurality of cells of the circuit structure, over a plurality of sub-intervals of a single clock period of a clock signal for operating the logic cells, amortize a power consumption of the logic cells into a set of grid tiles that comprise at least a portion of the logic cells, thus forming a set of power maps; and
   apply the power maps to a neural network to generate a current resistance (IR) drop prediction for the circuit structure in the clock period.

17. The non-transitory computer-readable storage medium of claim 16, the instructions when executed by the computer, causing the computer to further:
   train the neural network on a training set of circuit structures with known IR drop characteristics.

18. The non-transitory computer-readable storage medium of claim 17, the instructions when executed by the computer, causing the computer to further:
   train the neural network with power information about the cells generated from a simulation of the cells.

19. The non-transitory computer-readable storage medium of claim 16, the instructions when executed by the computer, causing the computer to further:
   compare the maximal IR drop prediction to a configured acceptable level of IR drop.

20. The non-transitory computer-readable storage medium of claim 19, the instructions when executed by the computer, causing the computer to further:
   proceed to generation of a routing for the circuit structure on condition that the maximal IR drop prediction meets the acceptable level of IR drop.

21. The non-transitory computer-readable storage medium of claim 16 the instructions when executed by the computer, causing the computer to further:
   enhance the power maps with sub-interval-independent values for scaled power, scaled internal power, and scaled switching power for the cells.

* * * * *